(12) United States Patent
Nolte

(10) Patent No.: US 12,315,000 B2
(45) Date of Patent: May 27, 2025

(54) METHOD FOR PRODUCTION AND SERVICE OF A REARRANGEABLE MATTRESS

(71) Applicant: Ahhfactor LLC, Milwaukee, WI (US)

(72) Inventor: Christopher E. Nolte, Milwaukee, WI (US)

(73) Assignee: AHHFACTOR LLC, Milwaukee, WI (US)

( * ) Notice: Subject to any disclaimer, the term of this patent is extended or adjusted under 35 U.S.C. 154(b) by 0 days.

(21) Appl. No.: 18/430,411

(22) Filed: Feb. 1, 2024

(65) Prior Publication Data

US 2024/0296490 A1    Sep. 5, 2024

Related U.S. Application Data

(62) Division of application No. 17/248,644, filed on Feb. 1, 2021, now Pat. No. 11,907,994, which is a division
(Continued)

(51) Int. Cl.
*G06Q 30/00* (2023.01)
*A47C 27/00* (2006.01)
(Continued)

(52) U.S. Cl.
CPC ....... *G06Q 30/0631* (2013.01); *A47C 27/001* (2013.01); *A47C 27/144* (2013.01);
(Continued)

(58) Field of Classification Search
CPC ........... G06Q 30/0601; G06Q 30/0613; G06Q 30/0623; G06Q 30/0629; G06Q 30/0631
See application file for complete search history.

(56) References Cited

U.S. PATENT DOCUMENTS

D139,146  S     2/1944  Martin
3,308,490 A     3/1967  Cacioppo
(Continued)

FOREIGN PATENT DOCUMENTS

DE    10 2014 113 073 A1    3/2016
FR          2937232 A1      4/2010

OTHER PUBLICATIONS

Caroline Igo "I Asked AI to Recommend a Mattress. Here's How It Compares to Advice From an Expert" Nov. 6, 2023. Retrieved from https://www.cnet.com/health/sleep/i-asked-ai-to-recommend-me-a-bed-heres-how-it-compares-to-advice-from-a-mattress-expert/ (Year: 2023).*

(Continued)

*Primary Examiner* — Christopher B Seibert
(74) *Attorney, Agent, or Firm* — Foley & Lardner LLP

(57) ABSTRACT

A method including receiving an input regarding a mattress assembly from an end user, the input including an indication of a desired feel and a plurality of current layers included in the mattress assembly, querying a database using the received input, receiving a list of layers and a layer arrangement from the database in response to the query, determining if the plurality of current layers matches the list of layers, identifying at least one of a specialty layer or a replacement layer when the plurality of current layers do not match the list of layers, determining a recommendation including the list of layers, an indication of a cost of the identified at least one of the specialty layer or the replacement layer when the plurality of current layers does not match the list of layers, and the layer arrangement, and sending the recommendation to the end user.

13 Claims, 25 Drawing Sheets

Related U.S. Application Data of application No. 15/965,533, filed on Apr. 27, 2018, now Pat. No. 10,909,605.

(51) Int. Cl.
  *A47C 27/14* (2006.01)
  *A47C 27/15* (2006.01)
  *G06Q 30/0601* (2023.01)

(52) U.S. Cl.
  CPC ............ *A47C 27/148* (2013.01); *A47C 27/15* (2013.01); *G06Q 30/0621* (2013.01)

(56) References Cited

U.S. PATENT DOCUMENTS

| | | | |
|---|---|---|---|
| 4,015,299 A | 4/1977 | Tinnel | |
| 4,062,077 A | 12/1977 | Autrey et al. | |
| 4,173,049 A | 11/1979 | Underwood et al. | |
| 4,187,566 A | 2/1980 | Peterson | |
| 4,449,261 A | 5/1984 | Magnusson | |
| 4,553,780 A * | 11/1985 | Strachan | A47C 31/08 |
| | | | 294/149 |
| 5,231,714 A | 8/1993 | Mossbeck | |
| 5,513,402 A | 5/1996 | Schwartz | |
| 5,953,779 A | 9/1999 | Schwartz | |
| 5,960,496 A | 10/1999 | Boyd | |
| 6,243,900 B1 * | 6/2001 | Gladney | A47C 27/056 |
| | | | 5/727 |
| 6,256,821 B1 | 7/2001 | Boyd | |
| 6,571,192 B1 | 5/2003 | Hinshaw et al. | |
| 7,444,706 B2 | 11/2008 | Gladney et al. | |
| 7,484,256 B2 | 2/2009 | Murphy et al. | |
| D634,146 S | 3/2011 | Kennett | |
| D634,574 S | 3/2011 | Morrison | |
| 8,296,976 B2 | 10/2012 | Murphy et al. | |
| 8,458,042 B1 | 6/2013 | Roberts et al. | |
| 8,676,662 B1 | 3/2014 | Roberts et al. | |
| 9,135,651 B2 | 9/2015 | Roberts et al. | |
| D773,209 S | 12/2016 | Jaigobin | |
| 9,592,005 B2 | 3/2017 | Oakhill | |
| 9,659,322 B2 | 5/2017 | Gorjanc et al. | |
| D794,981 S | 8/2017 | Roma et al. | |
| D804,853 S | 12/2017 | Wightman | |
| D831,382 S | 10/2018 | Huang | |
| D840,725 S | 2/2019 | Feldman | |
| 10,368,655 B2 | 8/2019 | Codos | |
| 10,441,087 B2 | 10/2019 | Karschnik et al. | |
| 10,909,605 B2 * | 2/2021 | Nolte | G06Q 30/0631 |
| 10,918,219 B2 * | 2/2021 | Nolte | A47C 31/001 |
| 12,137,816 B2 * | 11/2024 | Nolte | G06Q 30/0601 |
| 2001/0021914 A1 * | 9/2001 | Jacobi | G06Q 30/02 |
| | | | 705/26.1 |
| 2003/0125899 A1 * | 7/2003 | Hinshaw | A47C 31/123 |
| | | | 702/129 |
| 2004/0148706 A1 | 8/2004 | Visser et al. | |
| 2004/0261186 A1 | 12/2004 | Gladney | |
| 2006/0272098 A1 | 12/2006 | Hochschild | |
| 2007/0021965 A1 * | 1/2007 | Boyd | G06Q 30/02 |
| | | | 705/26.1 |
| 2007/0086947 A1 | 4/2007 | Boyd | |
| 2008/0201856 A1 | 8/2008 | Howard | |
| 2009/0038080 A1 | 2/2009 | Grigg | |
| 2009/0043715 A1 * | 2/2009 | Fan | G06N 20/20 |
| | | | 706/12 |
| 2009/0093990 A1 * | 4/2009 | McGuire | G01N 3/40 |
| | | | 702/139 |
| 2009/0106894 A1 | 4/2009 | Yeo | |
| 2009/0110089 A1 * | 4/2009 | Green | H04L 5/0037 |
| | | | 370/329 |
| 2009/0240514 A1 * | 9/2009 | Oexman | A47C 31/123 |
| | | | 702/50 |
| 2010/0064434 A1 * | 3/2010 | Amsler, Jr. | A47C 19/045 |
| | | | 5/488 |
| 2010/0170042 A1 | 7/2010 | Rose | |
| 2010/0192299 A1 | 8/2010 | Schermel et al. | |
| 2010/0268661 A1 * | 10/2010 | Levy | G06Q 30/02 |
| | | | 705/347 |
| 2011/0256369 A1 | 10/2011 | Switzer et al. | |
| 2013/0059607 A1 * | 3/2013 | Herz | H04L 67/12 |
| | | | 455/456.3 |
| 2013/0144751 A1 * | 6/2013 | Gorjanc | G06Q 30/0631 |
| | | | 705/26.7 |
| 2014/0035929 A1 * | 2/2014 | Matthews | G06T 17/20 |
| | | | 345/473 |
| 2014/0143955 A1 | 5/2014 | Nishimura et al. | |
| 2014/0222641 A1 * | 8/2014 | Kober | G06Q 40/04 |
| | | | 705/37 |
| 2015/0066706 A1 | 3/2015 | Wang et al. | |
| 2015/0121625 A1 | 5/2015 | Myers et al. | |
| 2015/0182042 A1 | 7/2015 | Jensen et al. | |
| 2015/0250327 A1 * | 9/2015 | Boyd | A47C 27/088 |
| | | | 705/26.7 |
| 2015/0294422 A1 * | 10/2015 | Carver | G06Q 40/08 |
| | | | 705/4 |
| 2015/0296993 A1 | 10/2015 | Boyd | |
| 2015/0296994 A1 | 10/2015 | Mikkelsen et al. | |
| 2015/0359351 A1 | 12/2015 | Wilder et al. | |
| 2016/0128489 A1 * | 5/2016 | Lesley | A47C 27/001 |
| | | | 5/722 |
| 2016/0345746 A1 * | 12/2016 | Myers | A47C 31/123 |
| 2017/0007034 A1 | 1/2017 | Shi | |
| 2017/0007035 A1 | 1/2017 | Shi | |
| 2017/0007047 A1 | 1/2017 | Shi | |
| 2017/0048672 A1 * | 2/2017 | Herz | H04W 8/18 |
| 2017/0116549 A1 * | 4/2017 | Sunshine | G06Q 30/02 |
| 2017/0202366 A1 | 7/2017 | Mackey | |
| 2017/0224126 A1 | 8/2017 | O'Connell, Jr. | |
| 2017/0318360 A1 * | 11/2017 | Tran | H04N 7/183 |
| 2018/0014161 A1 * | 1/2018 | Warren | G06F 16/24578 |
| 2018/0025418 A1 * | 1/2018 | Slater | G06Q 30/08 |
| | | | 705/37 |
| 2018/0068225 A1 * | 3/2018 | Miyoshi | G06N 5/022 |
| 2018/0110343 A1 | 4/2018 | Cik | |
| 2018/0116432 A1 | 5/2018 | Sotelo | |
| 2018/0192795 A1 | 7/2018 | Pacquette | |
| 2019/0057445 A1 * | 2/2019 | Fonss | G06Q 40/04 |
| 2019/0090651 A1 | 3/2019 | Gargalis | |
| 2019/0130466 A1 * | 5/2019 | Krishnan | G06Q 30/0619 |
| 2019/0298078 A1 | 10/2019 | Vester et al. | |
| 2019/0328150 A1 * | 10/2019 | Nolte | A47C 27/15 |
| 2019/0333127 A1 * | 10/2019 | Nolte | A47C 31/105 |
| 2020/0074523 A1 * | 3/2020 | Wang | G06Q 30/0631 |
| 2021/0235884 A1 * | 8/2021 | Nolte | G06Q 30/0621 |
| 2022/0117776 A1 * | 4/2022 | Nishiura | A47C 20/041 |
| 2022/0398638 A1 * | 12/2022 | Saijo | G06Q 30/0202 |
| 2023/0389714 A1 * | 12/2023 | Fernandez | G16H 50/30 |

OTHER PUBLICATIONS

Rofi Aditya et al. "Spring Bed Mattress Recommendation System Using Simple Additive Weighting Method" International Journal of Open Information Technologies ISSN: 2307-8162 vol. 11, No. 1, 2023 (Year: 2023).*

Wong, Duo Wai-Chi, et al. "Sleeping mattress determinants and evaluation: A biomechanical review and critique." PeerJ 7 (2019):e6364. (Year: 2019).*

"Gel Memory Foam Topper, Full Size 2 Inch Thick, Ultra-Premium Gel-Infused Memory Foam Mattress/Bed Topper/Pad for Better Sleep and Extra Comfort. Made in The USA" Aug. 17, 2016, p. 5, 1st comment, https://www.amazon.com/Memory-Foam-Topper-Mattress-Sleep/dp/B01GICXGMW/ref=asc_df_B01GICXGMW/?tag=hyprod20&1inkCode=dfO&hvadid=219229936727&hvpos=1o1&hvnetw=g&hvrand=8140951536729342269&hvpone=&hvptwo=&hvqmt=&hvdev=c&hvdvcmdl=&hvlocint=&hvlocphy=9021565&hvtargid=pla-363486165801&psc=1, 9 pages.

"Joint Industry Foam Standards and Guidelines", Jul. 1994, http://www.pfa.org/jifsg/jifsgs4.html, 6 pages.

Casper Editorial Team "How to Make a Bed: Layer by Layer in 8 Steps" Mar. 10, 2021. Retrieved from https://casper.com/blog/how-to-make-a-bed/ (Year: 2021) (15 pages).

(56) References Cited

OTHER PUBLICATIONS

International Search Report and Written Opinion for International Application No. PCT/US2018/049569, mail date Nov. 16, 2019, 10 pages.
Notice of Allowance issued for U.S. Appl. No. 17/248,644 dated Oct. 5, 2023 (10 pages).

* cited by examiner

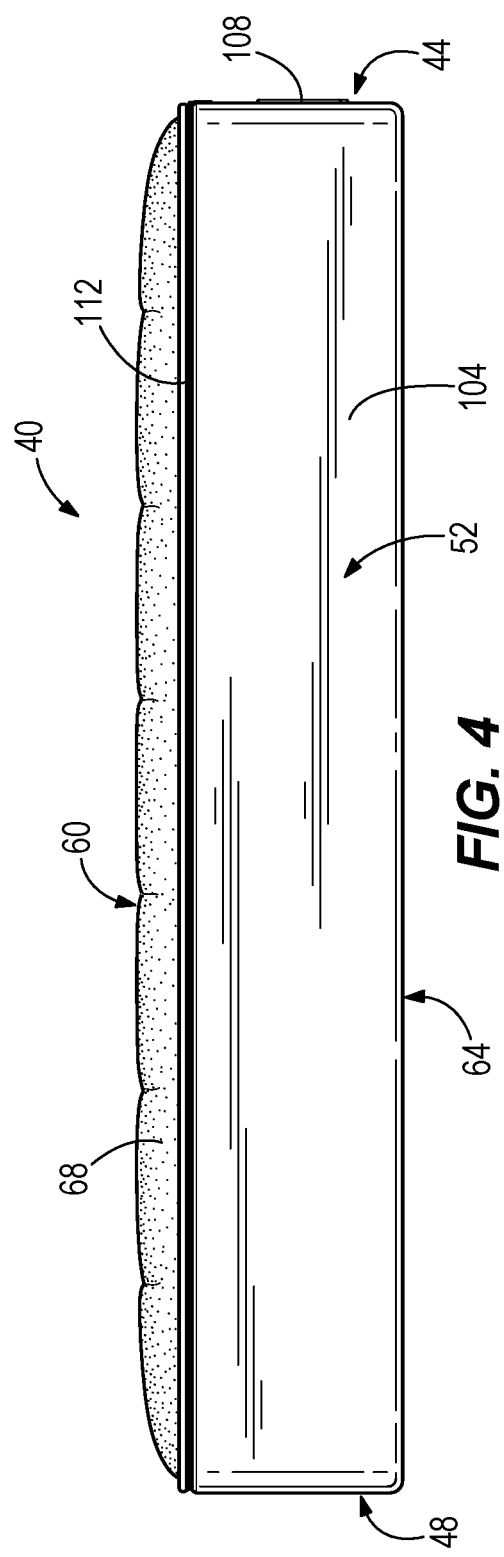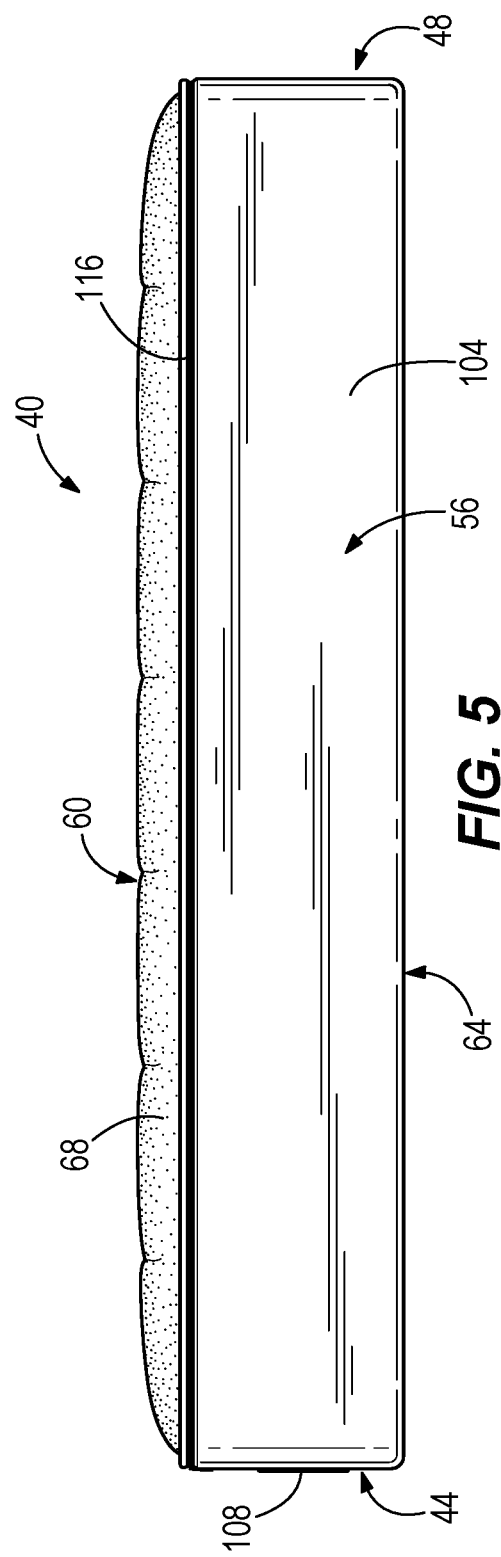

METHOD FOR PRODUCTION AND SERVICE OF A REARRANGEABLE MATTRESS

CROSS-REFERENCE TO RELATED APPLICATION

This application is a divisional application of U.S. patent application Ser. No. 17/248,644, filed Feb. 1, 2021, which is a divisional application of U.S. patent application Ser. No. 15/965,533, now U.S. Pat. No. 10,909,605, filed on Apr. 27, 2018, and is related to U.S. patent application Ser. No. 15/965,520, now U.S. Pat. No. 10,918,219, filed on Apr. 27, 2018, U.S. Design patent application Ser. No. 29/645,691, now U.S. Pat. No. D911,751, filed on Apr. 27, 2018, and U.S. Design patent application Ser. No. 29/645,690, filed on Apr. 27, 2018, all of which are incorporated herein by reference in their entirety and for all purposes.

BACKGROUND

The present invention relates generally to an apparatus, system, and method for providing a mattress for a user, and in particular to a mattress including multiple rearrangeable layers that allow the user to adjust the support level of the mattress.

SUMMARY

One embodiment relates to a method that includes receiving an input regarding a mattress assembly from an end user, the input including an indication of a desired feel and a plurality of current layers included in the mattress assembly, querying a database using the received input, receiving a list of layers and a layer arrangement from the database in response to the query, determining if the plurality of current layers matches the list of layers, identifying at least one of a specialty layer or a replacement layer when the plurality of current layers do not match the list of layers, determining a recommendation including the list of layers, an indication of a cost of the identified at least one of the specialty layer or the replacement layer when the plurality of current layers does not match the list of layers, and the layer arrangement, and sending the recommendation to the end user.

Another embodiment relates to a method that includes inserting a plurality of non-laminated and rearrangeable foam layers into a tub including vertically extending rails and a base and defining an interior cavity bound by the rails and the base, installing a cover system over the assembled plurality of layers to provide a mattress assembly, the cover system including a removable cover allowing selective access to the plurality of layers and the interior cavity and selectively compressing the plurality of layers within the tub, receiving an input regarding the mattress assembly from an end user, the input including an indication of a desired feel, querying a database using the received input, receiving a layer arrangement from the database in response to the query, determining a recommendation including the layer arrangement, sending the recommendation to the end user, and rearranging the mattress assembly according to the recommendation.

Another embodiment relates to a controller that includes a communications interface structured in communication with an end user, a current layer circuit structured to receive a current order of a plurality of layers positioned within a tub of a mattress assembly and a desired feel, a recommendation circuit structured to receive the current order and the desired feel from the current layer circuit, query a database stored in a memory using the received current order and desired feel, receive a layer arrangement from the database in response to the query, and determine a recommendation including the layer arrangement, and a marketplace circuit structured to receive the layer arrangement and communicate the layer arrangement to the end user via the communication interface to facilitate the rearrangement of the mattress assembly.

Alternative exemplary embodiments relate to other features and combinations of features as may be generally recited in the claims.

BRIEF DESCRIPTION OF THE FIGURES

The disclosure will become more fully understood from the following detailed description, taken in conjunction with the accompanying figures, in which:

FIG. 4 is a left view of the mattress assembly of FIG. 1.

FIG. 5 is a right view of the mattress assembly of FIG. 1.

DETAILED DESCRIPTION

Figure 1:
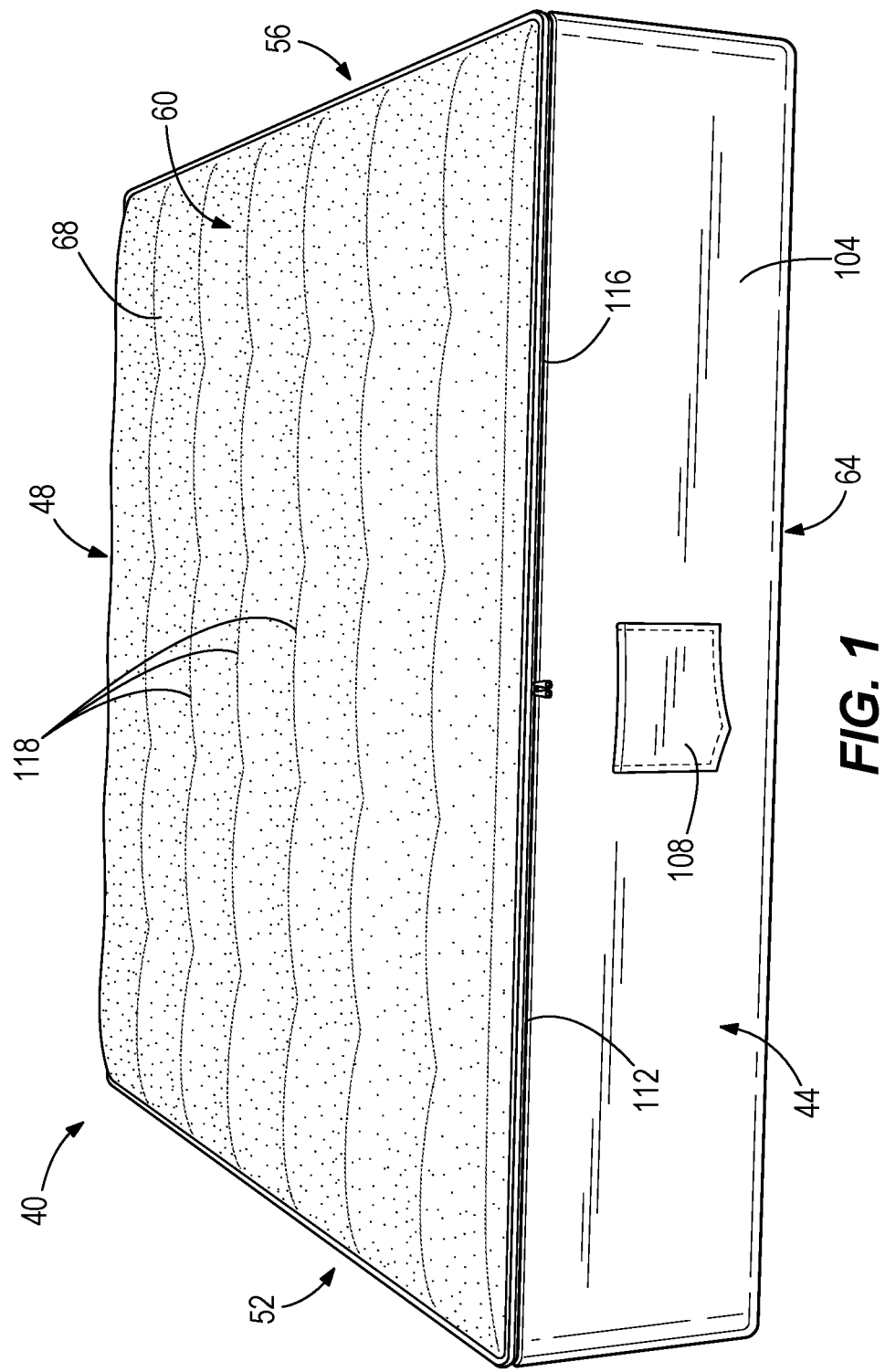
FIG. 1 is a perspective view of one embodiment of a mattress assembly.
Figure 2:
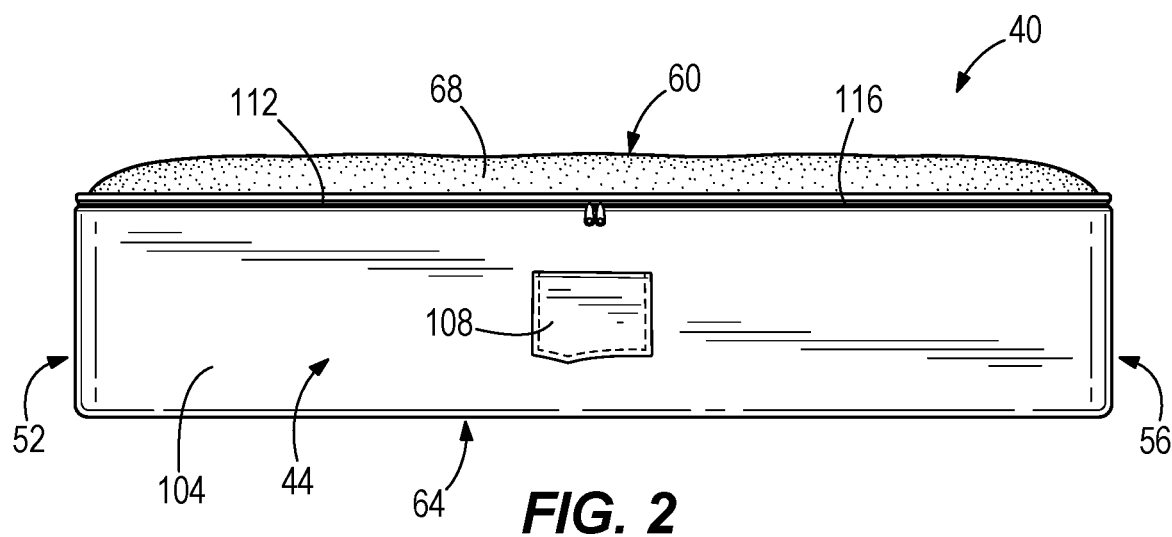
FIG. 2 is a front view of the mattress assembly of FIG. 1.
Figure 3:
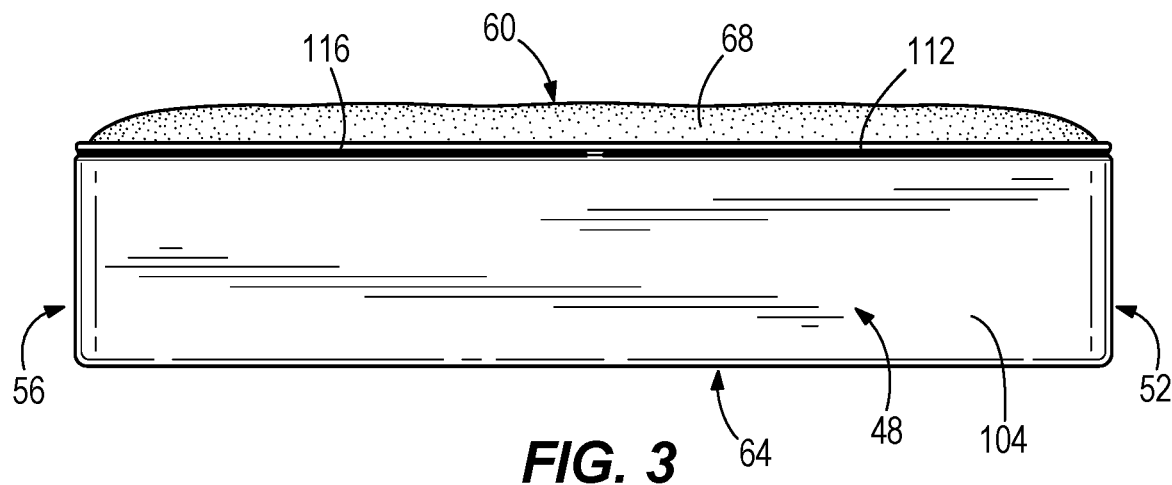
FIG. 3 is a back view of the mattress assembly of FIG. 1.
Figure 6:
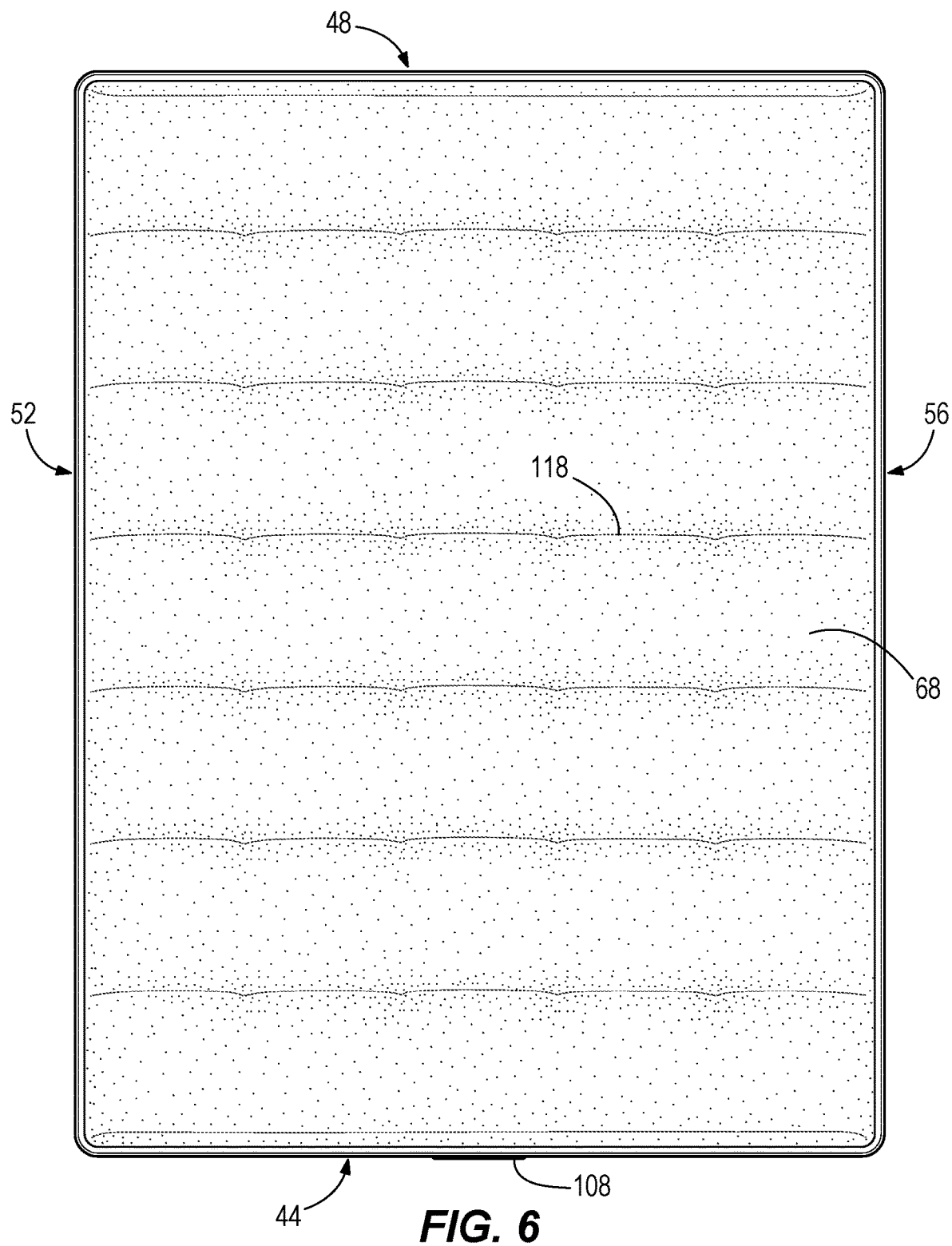
FIG. 6 is a top view of the mattress assembly of FIG. 1.
Figure 7:
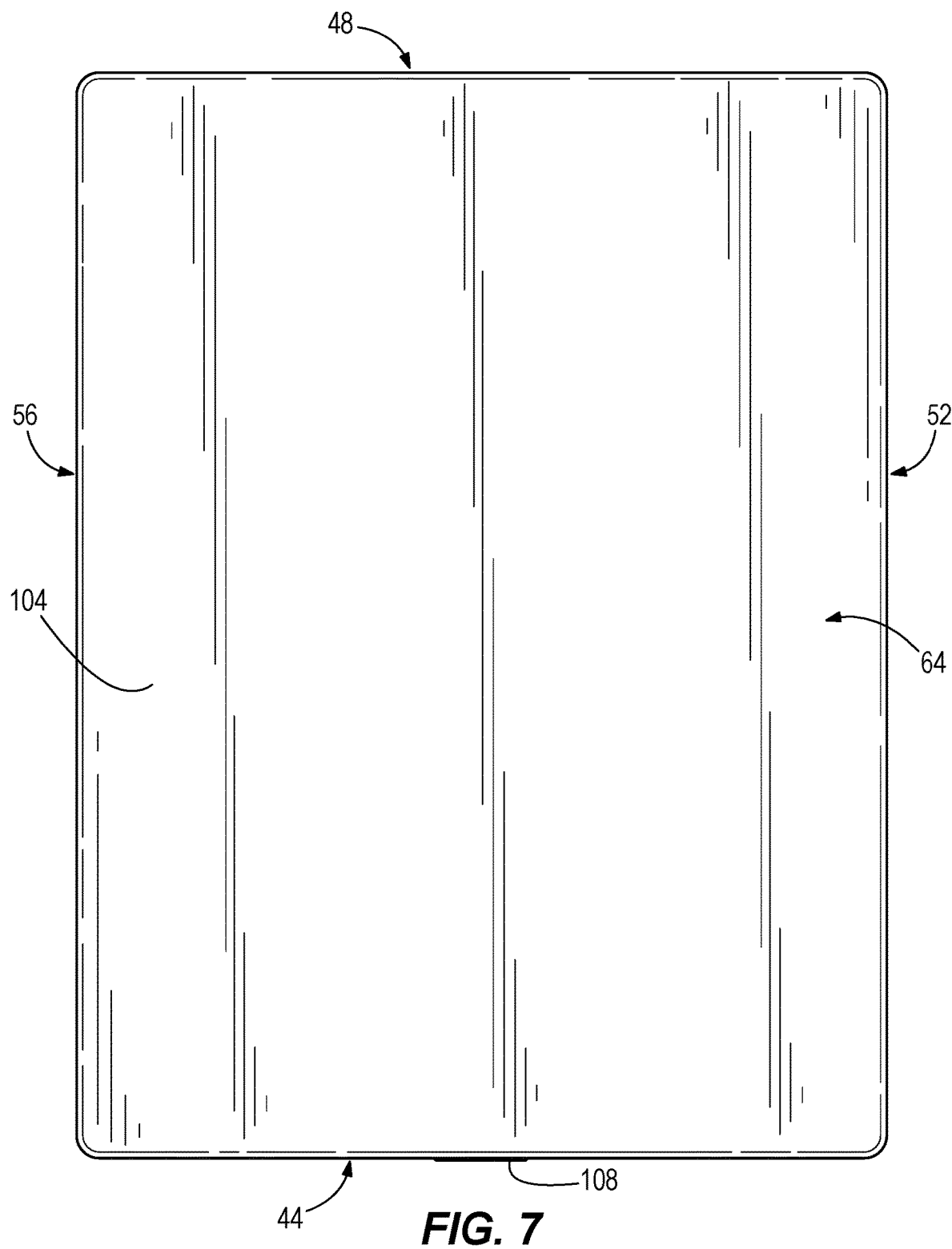
FIG. 7 is a bottom view of the mattress assembly of FIG. 1.

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

Referring generally to the drawings, a mattress assembly allows a user to select a comfort level and includes a tub, a variety of rearrangeable layers inserted into the tub, an inner liner surrounding the tub, an inner cover attached to the inner liner, an outer liner surrounding the inner liner, and a top cover attached to the outer liner. A process for preparing the mattress assembly for shipment to an end user includes compressing, vacuum sealing, boxing the assembled mattress, shipping the assembled mattress, unpacking the assembled mattress, and rearranging the assembled mattress. A process of rearranging the mattress assembly includes receiving user input, analyzing a database, determining a recommendation, receiving instructions, retrieving an additional component from a warehouse, packaging the component, and shipping the component to an end user. Finally, a controller for performing the processes is shown.

The modular nature of the mattress assembly allows the end user to design and adjust their own mattress. In the last few years, the online sales channel for mattress products has grown exponentially with the advent and consumer adoption of the "bed in the box" concept. Manufacturers have figured out a way to compress a mattress, put it into a box, and ship it directly to customers via FedEx or UPS. This method of sales and logistics is efficient because it circumvents the costs associated with traditional retail brick and mortar, sales, and delivery that sales channel and fulfillment methodology. For most of the day that a specialty mattress store is open there are few to no customers in the store. And yet, mattress sales online continue to lag the overall penetration rates for other furniture sold online because customers believe that mattress comfort needs to be tested before the product is delivered. Comfort is subjective from customer to customer.

Most people find themselves coping with suboptimal sleep solutions. It is hard to test a mattress product in a retail environment because it requires a customer to simulate a sleep environment in a public space, most times when they are fully clothed. Further, most couples themselves have different sleep comfort needs, which means that unless the product is adjustable, one person ends up coping.

Furthermore, individuals comfort needs change over time. The human body changes over time but a person's mattress does not change with them. Because change happens gradually, the difference between an individual's sleep comfort needs and their sleep solution grows imperceptibly over time until finally after months or years the individual realizes that they need to upgrade to a new mattress. This realization happens more quickly after being injured, and the mattress doesn't feel comfortable anymore in the pain associated with this difference is hard to ignore.

One goal of this disclosure is to provide a kit of parts that can re-create many different comfort solutions, and at the same time, allow users to swap out elements of the kit with other parts and pieces found in conventional mattresses, so that the end-user has full control at a moment's notice of the user's sleep solution.

The mattress assembly described herein allows the end user to have customized comfort. Various embodiments of the mattress assembly and processes are described in detail below.

Figure 8:
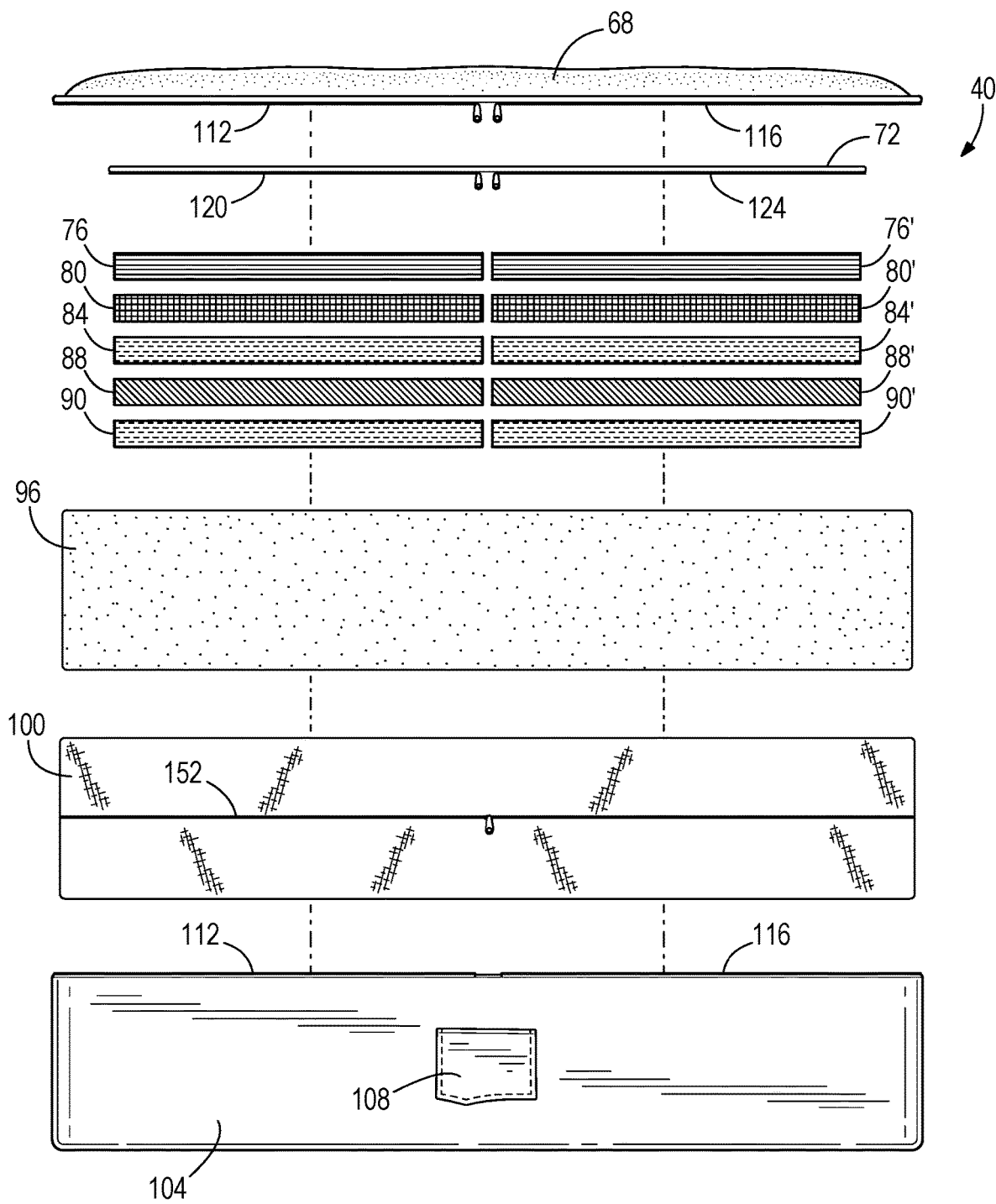
FIG. 8 is an exploded view of the mattress assembly of FIG. 1.

As shown in FIG. 1, a rearrangeable mattress assembly 40 has a generally rectangular shape and includes a front side 44, a back side 48, a left side 52, a right side 56, a top side 60, and a bottom side 64 (see FIGS. 2-7 for additional views of the various sides of the mattress assembly 40). As shown in FIG. 8, the mattress assembly 40 includes a top cover 68, an inner cover 72, a first layer in the form of a cool layer 76, a second layer in the form of a flex layer 80, a third layer in the form of a first dream layer 84, a fourth layer in the form of a tight layer 88, a fifth layer in the form of a second dream layer 92, a tub 96, an inner liner 100, an outer liner 104, and a pocket 108.

The exterior of the mattress assembly 40 generally includes the top cover 68 attached to the outer liner 104 by a first outer zipper 112 and a second outer zipper 116. The first outer zipper 112 extends around the mattress assembly 40 from the back side 48, to the left side 52, and finally to the front side 44 of the mattress assembly 40. The second outer zipper 116 extends around the mattress assembly 40 from the back side 48, to the right side 56, and finally to the front side 44 of the mattress assembly 40. The first outer zipper 112 and the second outer zipper 116 meet at a central portion of the front side 44 of the mattress assembly 40 to attach the top cover 68 to the outer liner 104. With the top cover 68 zipped to the outer liner 104, the inner cover 72, the cool layer 76, the flex layer 80, the first dream layer 84, the tight layer 88, the second dream layer 92, the tub 96, and the inner liner 100 are hidden from the end user's view.

In some embodiments, the top cover 68 is a quilted top cover and includes a top fabric, a quilt filler (e.g., 0.5 FR fire retardant fiber, 0.75 inches of poly fiber, and one inch of 1.5 pound/17 Indentation Load Deflection (ILD) foam), and a bottom fabric. The top cover 68 is not a tight-top of a knit-top. In some embodiments, the top cover 68 is constructed with a border fabric that is laminated with 0.5 FR fire retardant fiber and stitched to the top fabric, the quilt filler, the bottom fabric, the first outer zipper 112 and the second outer zipper 116. The quilted top cover 68 includes more than a quarter inch of material between the top fabric and the bottom fabric. In some embodiments, the top cover 68 is stitched with a distinctive pattern 118. For example, as shown in FIG. 1, the top cover 68 is stitched with an arced or wave pattern 118 to provide a distinctive aesthetic look. The first outer zipper 112 and the second outer zipper 116 are positioned at an edge of the top cover 68 and taped to the boarder fabric with a fire-retardant flange. In some embodiments, the first outer zipper 112 and the second outer zipper 116 are #8 MM zippers with a color matched or coordinating with the outer liner 104. In some embodiments, the top cover 68 provides fire retardant characteristics and meets all applicable fire standards for mattresses used in residential and service industry standards. In some embodiments, the top cover 68 is constructed to survive a top burn test using a smoldering heat source, and a direct flame test.

The outer liner 104 is stitched or otherwise bonded to the first outer zipper 112 and the second outer zipper 116 at an upper edge of the outer liner 104. The outer liner 104 and the top cover 68 are sized so that with the top cover 68 zipped to the outer liner 104, the interior components are retained therewithin under compression. Additionally, the location of the first outer zipper 112 and the second outer zipper 116 provide a continuous panel of fabric along substantially the entire height of the outer liner 104. In some embodiments, the outer liner 104 is constructed from a denim material or a denim like material. The pocket 108 is stitched to the front side 44 of the outer liner 104. In other embodiments, the pocket 108 may be adhered to the outer liner 104, formed with the outer liner 104, and/or attached to a different side of the outer liner 104, or even a different component of the mattress assembly 40.

The inner cover 72 includes a first inner zipper 120 and a second inner zipper 124 that attach the inner cover 72 to the inner liner 100. The first inner zipper 120 extends around the mattress assembly 40 from the back side 48, to the left side 52, and finally to the front side 44 of the mattress assembly 40. The second inner zipper 124 extends around the mattress assembly 40 from the back side 48, to the right side 56, and finally to the front side 44 of the mattress assembly 40. The first inner zipper 120 and the second inner zipper 124 are used to attach the inner cover 72 to the inner liner 100. When the inner cover 72 is zipped to the inner liner 100, the cool layer 76, the flex layer 80, the first dream layer 84, the tight layer 88, the second dream layer 92, and the tub 96 are compressed therewithin. As used within this document, the term compressed may mean under compression such that the inner liner 100 is slightly undersized relative to the contents within, or sized to hold the components without allowing expansion or shifting within the inner liner 100. The inner liner 100 also includes a third inner zipper 152 arranged approximately in the middle of a height of the inner liner 100 and extends substantially around the entire inner liner 100. In some embodiments, the third inner zipper 152 aids in assembly of the mattress assembly 40 as discussed in further detail below. In some embodiments, the inner cover 100 is constructed of a fire-retardant fabric such as C267 FR Grey Stitchbond. In some embodiments, the inner cover 72 is constructed of mesh material such as a 185 grams per square meter white spacer mesh. In some embodiments, the first inner zipper 124 and the second inner zipper 124 are #5 MM zippers and are color matched or coordinated with the inner cover 72. In some embodiments, the top cover 68 and the inner liner 100 along with the zippers 112, 116, 120, 124 provide a fire retardant envelop that together pass required fire testing (e.g., direct flame and smoldering heat source tests). For example, the top cover 68, the inner liner 100, and the zippers 112, 116, 120, 124 together meet the requirements of 16 CFR 1632 and 16 CFR 1633.

In some embodiments, the mattress assembly 40 is dual sided or arranged to be slept on by two people. In such cases, each sleeper may desire a different feel to their corresponding side of the mattress assembly 40. In a dual sided mattress assembly 40, the layers 76-92 are duplicated in layers 76'-92'. Description of the layers 76-92 may also refer to the layers 76'-92'. In the embodiment shown, the layers 76-92 and 76'-92' are in contact in a central portion of the tub 96. The widths of the layers 76-92 can be adjusted to accommodate various sizes of the mattress assembly 40. For example, the mattress assembly 40 may be arranged as a twin mattress, a double mattress, a queen mattress, a king mattress, or a California king mattress, as desired.

The cool layer 76 retains coolness and regulates the body heat of the end user to reduce overheating when laying on the mattress assembly 40 for extended periods of time. In some embodiments, the cool layer 76 has a thickness of 1.5 inches. In some embodiments, the cool layer 76 has thickness between about 1.25 inches and about 1.75 inches. One example of a suitable material for the cool layer 76 is a four-pound gel memory foam. In other embodiments, cool layer 76 may be of substantially different size and comprise substantially different materials. The cool layer 76 also includes a first layer identifier. In some embodiments, the first layer identifier is a blue color or a blue and white swirled color. In some embodiments, the first layer identifier is a word string or label that identifies the first layer to the end user. In some embodiments, the first layer identifier may be an image, a texture or another identifying feature.

The flex layer 80 provides bounce and pressure relief to the mattress assembly 40. In some embodiments, the flex layer 80 has a thickness of 1.5 inches. In some embodiments, the flex layer 80 has a thickness between about 1.25 inches and about 1.75 inches. One example of a suitable material for the flex layer 80 is a synthetic latex polyurethane mix. In other embodiments, flex layer 80 may be of substantially different size and comprise substantially different materials. The flex layer 80 also includes a second layer identifier. In some embodiments, the second layer identifier is a yellow or beige color. In some embodiments, the second layer identifier is a word string or label that identifies the second layer to the end user. In some embodiments, the second layer identifier may be an image, a texture or another identifying feature.

The first dream layer 84 provides extra support and reduces the bounciness of the mattress assembly 40. In some embodiments, the first dream layer 84 has a thickness of 1.5 inches. In some embodiments, the first dream layer 84 has thickness between about 1.25 inches and about 1.75 inches. One example of a suitable material for the first dream layer 80 is a polyurethane foam with a 1.8 pounds per cubic foot density and a 33 ILD. In other embodiments, first dream layer 84 may be of substantially different size and comprise substantially different materials. The first dream layer 84 also includes a third layer identifier. In some embodiments, the third layer identifier is a grey color. In some embodiments, the third layer identifier is a word string or label that identifies the third layer to the end user. In some embodiments, the third layer identifier may be an image, a texture or another identifying feature.

The tight layer 88 increases a firmness of the mattress assembly 40. In some embodiments, the tight layer 88 has a thickness of 1.5 inches. In some embodiments, the tight layer 88 has thickness between about 1.25 inches and about 1.75 inches. One example of a suitable material for the tight layer 88 is a polyurethane foam with a 1.8 pounds per cubic foot density and a 45 ILD. In other embodiments, tight layer 88 may be of substantially different size and comprise substantially different materials. The tight layer 88 also includes a fourth layer identifier. In some embodiments, the fourth layer identifier is a green color. In some embodiments, the fourth layer identifier is a word string or label that identifies the fourth layer to the end user. In some embodiments, the fourth layer identifier may be an image, a texture or another identifying feature.

The illustrated second dream layer 92 is substantially similar to the first dream layer 84. In some embodiments, the second dream layer 92 has a thickness of 1.5 inches. In some embodiments, the second dream layer 92 has thickness between about 1.25 inches and about 1.75 inches. In other embodiments, second dream layer 92 may be of substantially different size or comprise substantially different materials. The second dream layer 92 also includes a fifth layer identifier. In some embodiments, the fifth layer identifier is substantially the same as the third layer identifier and includes a grey color. In some embodiments, the fifth layer identifier is different from the third layer identifier. In some embodiments, the fifth layer identifier is a word string or label that identifies the fifth layer to the end user. In some embodiments, the fifth layer identifier may be an image, a texture or another identifying feature.

The layers 76-92 may be rearranged in differing orders from top to bottom to provide varying levels of support and comfort to the end user of the mattress assembly 40. In some embodiments, the top-to-bottom order of layers 76-92 does not match the top-to-bottom order of the layers 76'-92'. A differing order of the layers 76-92 and the layers 76'-92' allow the end user to select two different levels of support and comfort within the mattress assembly 40. In an example embodiment, the layers 76-92 may be arranged in the top-to-bottom order of the flex layer 80, the chill layer 76, the first dream layer 84, the tight layer 88, and finally second dream layer 92. Such an arrangement of the layers 76-92 would cause a portion of the mattress assembly 40 containing the layers 76-92 to have a medium level of firmness while retaining bounciness. In the same embodiment, the layers 76'-92' may be arranged in the order, from top to bottom, of the cool layer 76', the flex layer 80', the tight layer 88', the first dream layer 84', and finally the second dream layer 92'. Such an arrangement of the layers 76'-92' would cause a portion of the mattress assembly 40 containing the layers 76'-92' to have a high level of firmness with a low level of bounciness. In still other embodiments, the layers 76-92 and 76'-92' may be arranged in still other orders to provide different levels of firmness and bounciness within the mattress assembly 40. Additionally, the end user may decide to mix the layers 76-92 and the layers 76'-92' between the two sides. For example, the end user could arrange the left side of the mattress assembly 40 in a top-to-bottom order of the cool layer 76, the cool layer 76', the tight layer 88, the tight layer 88', and finally the second dream layer 92. The rearrangeability of the layers 76-92 and 76'-92' provides hundreds of possible iterations for the arrangement and feel of the mattress assembly 40.

Figure 9:
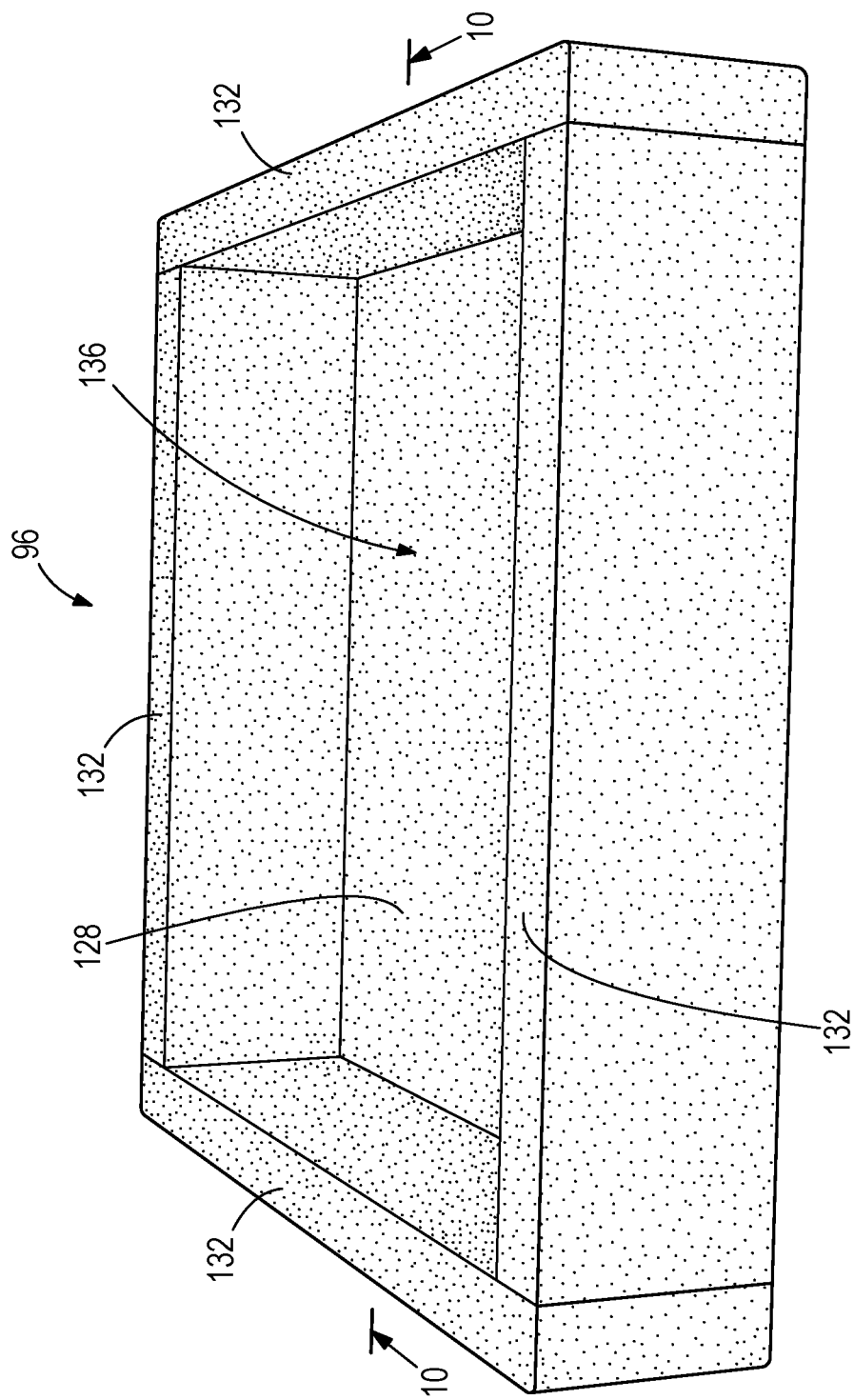
FIG. 9 is a perspective view of a tub of the mattress assembly of FIG. 1.

As shown in FIG. 9, the tub 96 includes a base 128 and four rails 132. The rails 132 are glued together and extend along an exterior perimeter of the mattress assembly 40. The base 128 is glued within the rails 132. The tub 96 defines an interior cavity 136 that is sized to receive the layers 76-92, 76'-92'. The rails 132 are adhered together and to the base 128 with a polystyrene foam glue. In some embodiments, the rails 132 and the base 128 are coupled together using a different technique or a different adhesive. In some embodiments, the rails 128 and the base 128 are formed as one solid piece during construction. For example, a foam form could be used. One example of a suitable material for a tub 96 is a polyurethane foam with a 1.8 pounds per square cubic foot density and a 33 ILD. In some embodiments, base 128 and rails 132 are made of the same material. In other embodiments, base 128 and rails 132 are made of different materials. The tub 96 helps the end user align the layers 76-92, 76'-92'. The tub 96 also cleans up the aesthetics of the outside edge of the mattress assembly 40 for the benefit of firmness. Additionally, the tub 96 inhibits the layers 76-92, 76'-92' from sliding when used on an adjustable base.

Figure 10:
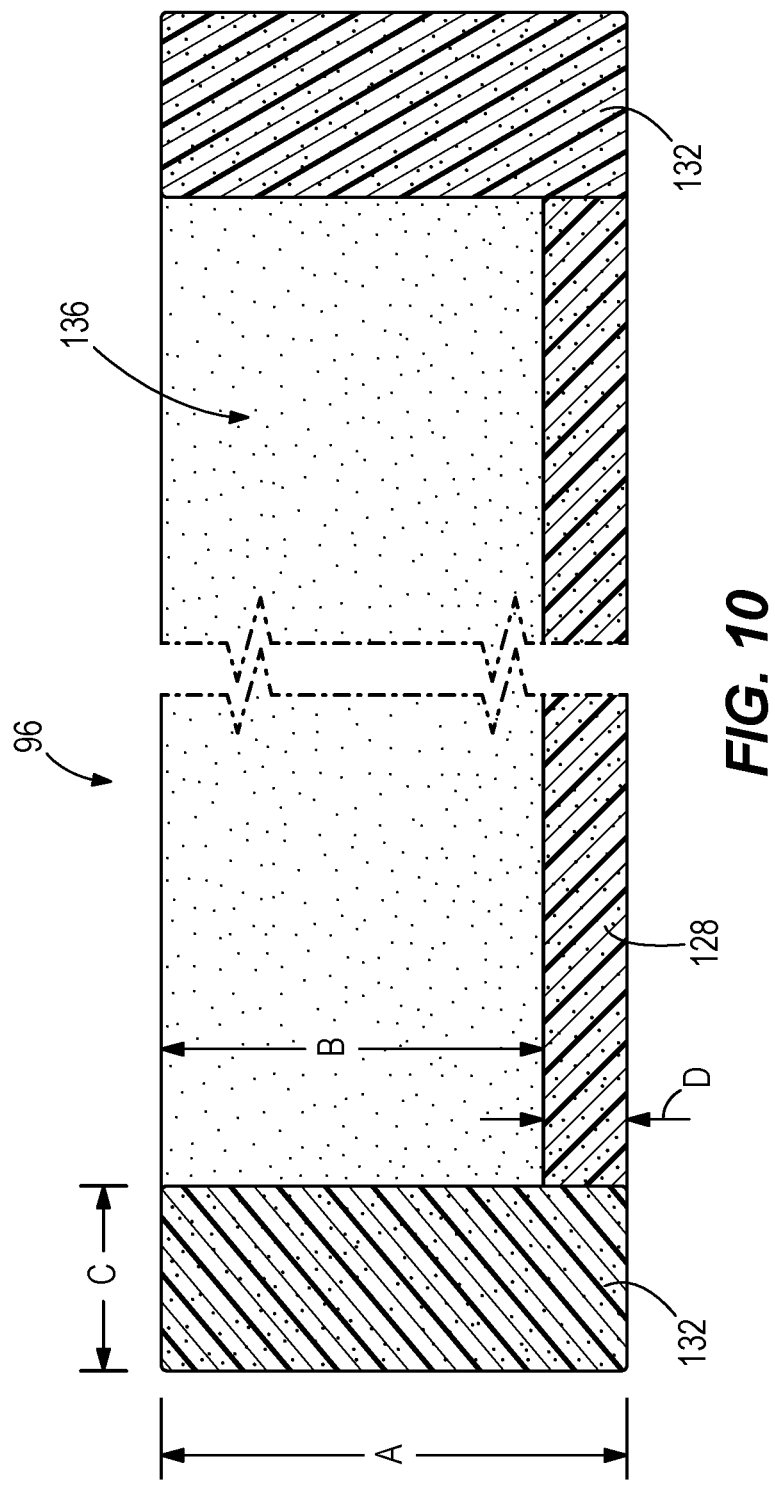
FIG. 10 is a cross-sectional view of the tub taken along line 10-10 of FIG. 9.

As shown in FIG. 10, the rails 132 of the tub 96 define a rail height A of about twelve inches (12"). In some embodiments, the rail height A is between about ten inches (10") and about fourteen inches (14"). A cavity height B of the interior cavity 136 is about seven and one-half inches (7.5"). In some embodiments, the cavity height B is between about six inches (6") and about nine inches (9"). The rails 132 define a rail width C of about three inches (3"). In some embodiments, the rail width C is between about two and one-half inches (2.5") and about four inches (4"). The base 128 of the tub 96 defines a base height D of about four and one-half inches (4.5"). In some embodiments, the base height D is between about three inches (3") and about six inches (6"). In some embodiments, a ratio of the rail height A to the cavity height B is about 1.6. In some embodiments, the ratio of the rail height A to the cavity height B is between about 1.4 and about 1.8. In some embodiments, a ratio of the cavity height B to the base height D is about 1.67. In some embodiments, the ratio of the cavity height B to the base height D is between about 1.5 and about 1.9. In some embodiments, a ratio of the cavity height B to the rail width C is about 2.5. In some embodiments, the ratio of the cavity height B to the rail width C is between about 2.3 and about 2.7. In some embodiments, a ratio of the rail height A to the base height D is about 2.67. In some embodiments, the ratio of the rail height A to the base height D is between about 2.5 and about 2.9. In some embodiments, a ratio of the rail width C to the base height D is about 0.67. In some embodiments, the ratio of the rail width C to the base height D is between about 0.6 and about 0.8.

Figure 11:
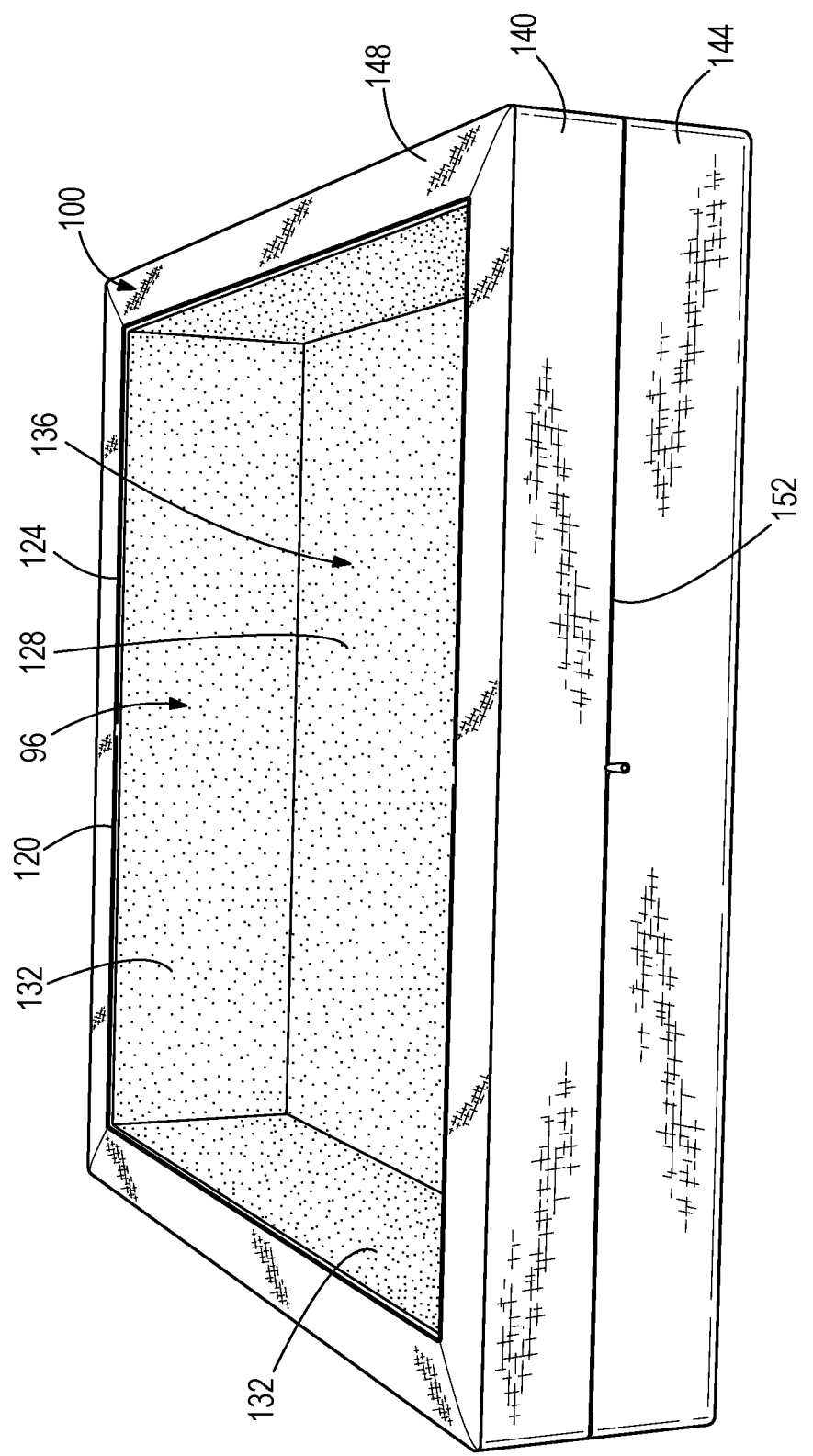
FIG. 11 is a perspective view of an inner liner surrounding the tub of the mattress assembly of FIG. 1.
Figure 12:
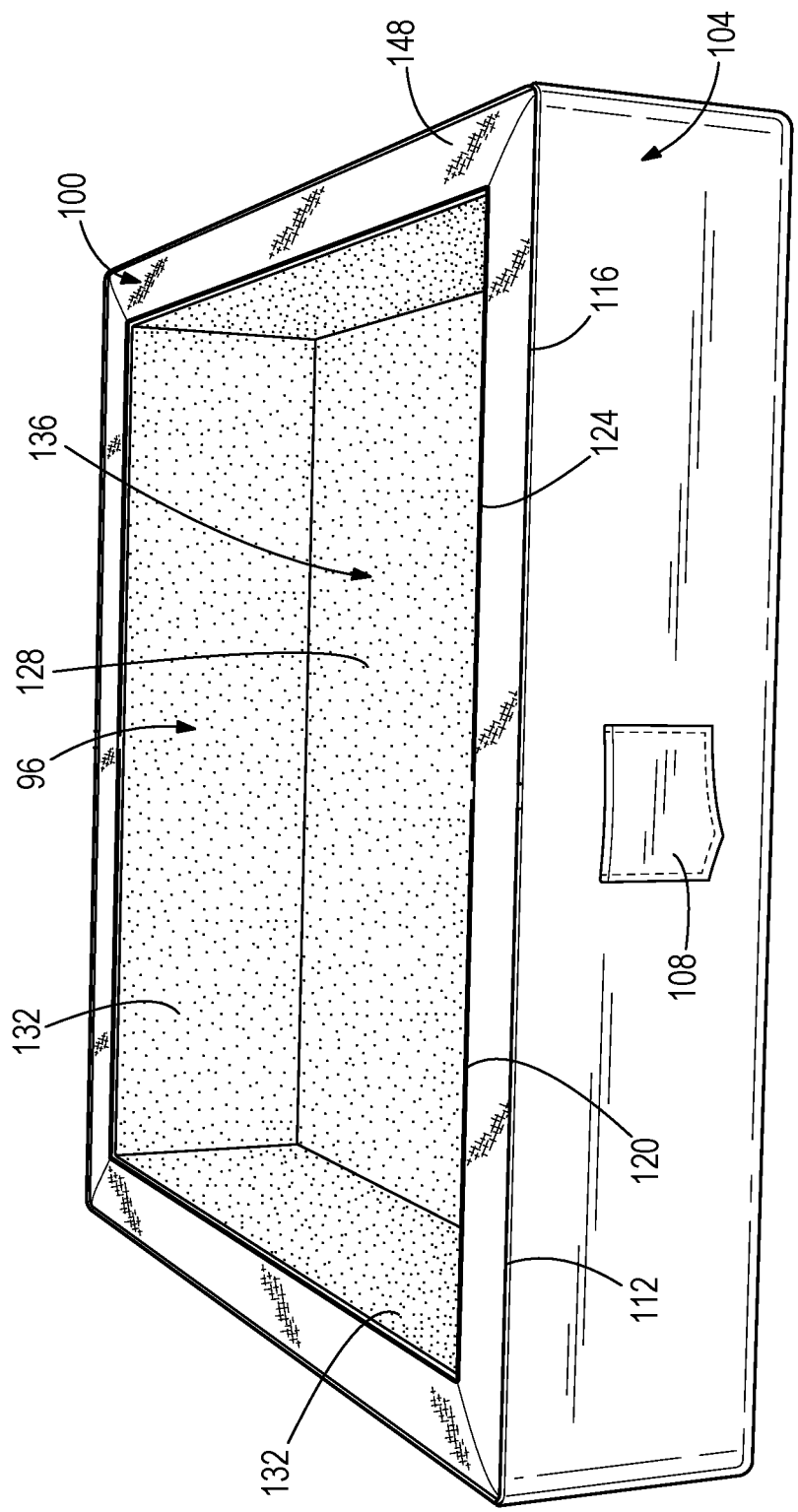
FIG. 12 is a perspective view of the tub and inner liner of the mattress assembly of FIG. 1 within an outer liner.
Figure 13:
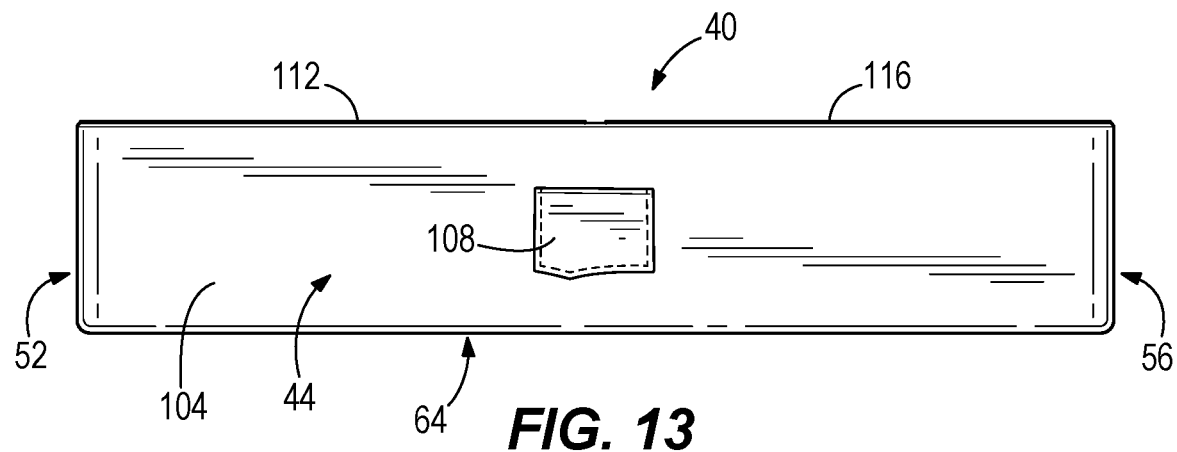
FIG. 13 is a front view of the tub, inner liner, and outer liner of FIG. 12.
Figure 14:
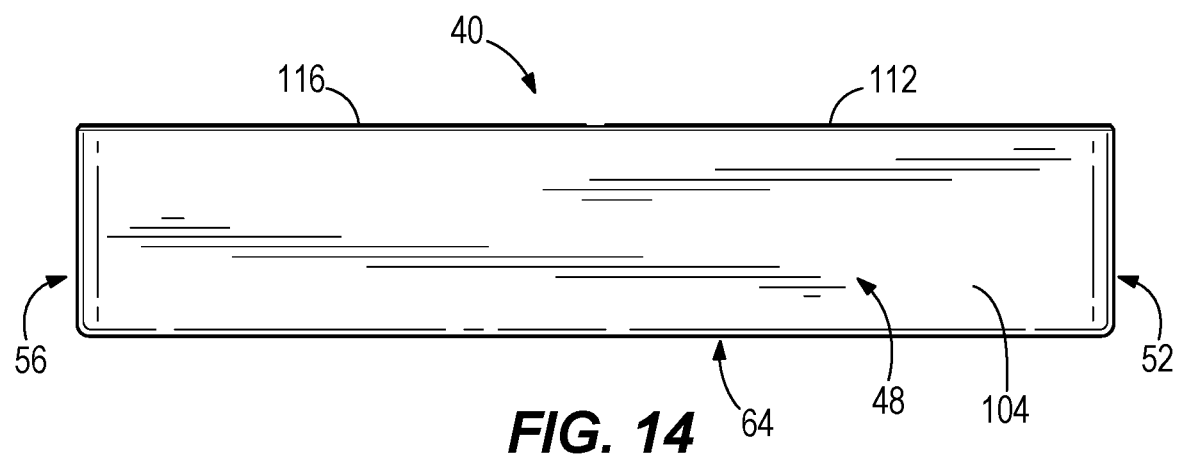
FIG. 14 is a back view of the tub, inner liner, and outer liner of FIG. 12.
Figure 15:
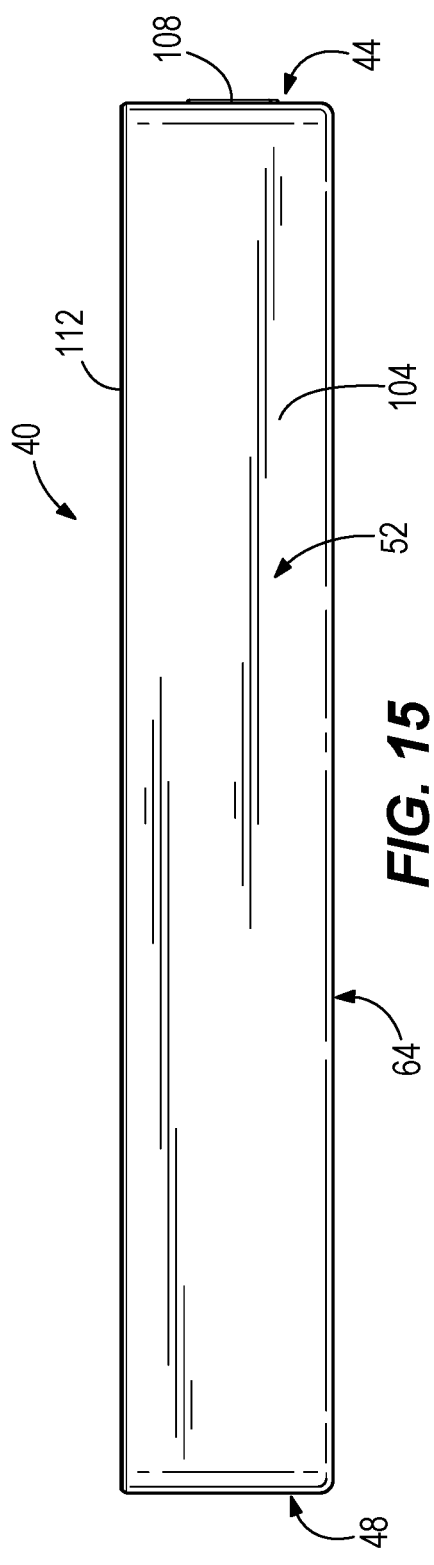
FIG. 15 is a right view of the tub, inner liner, and outer liner of FIG. 12.
Figure 16:
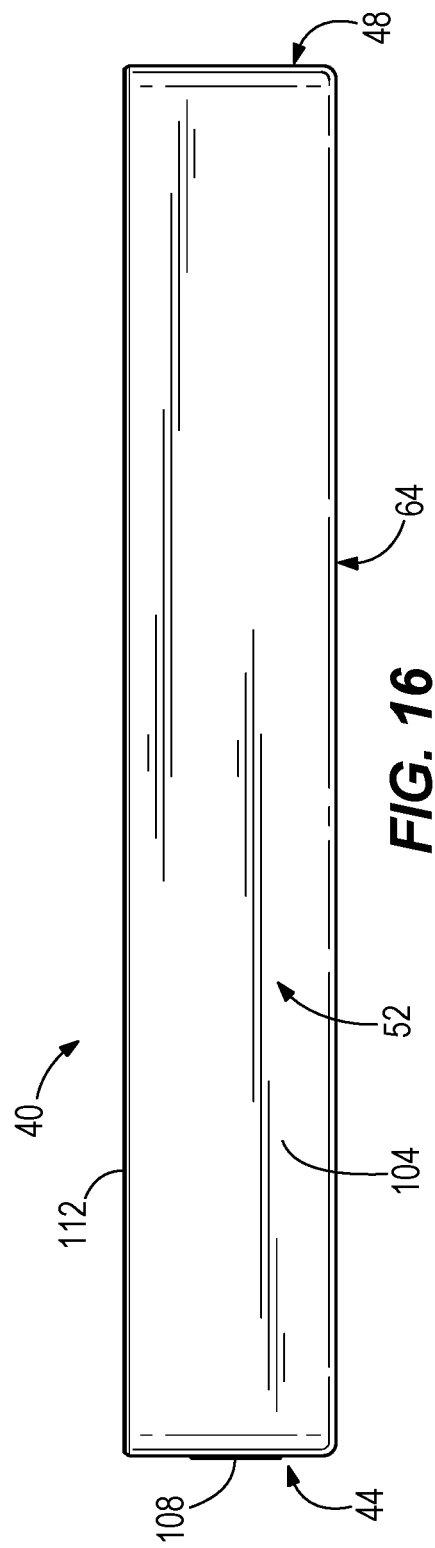
FIG. 16 is a left view of the tub, inner liner, and outer liner of FIG. 12.
Figure 17:
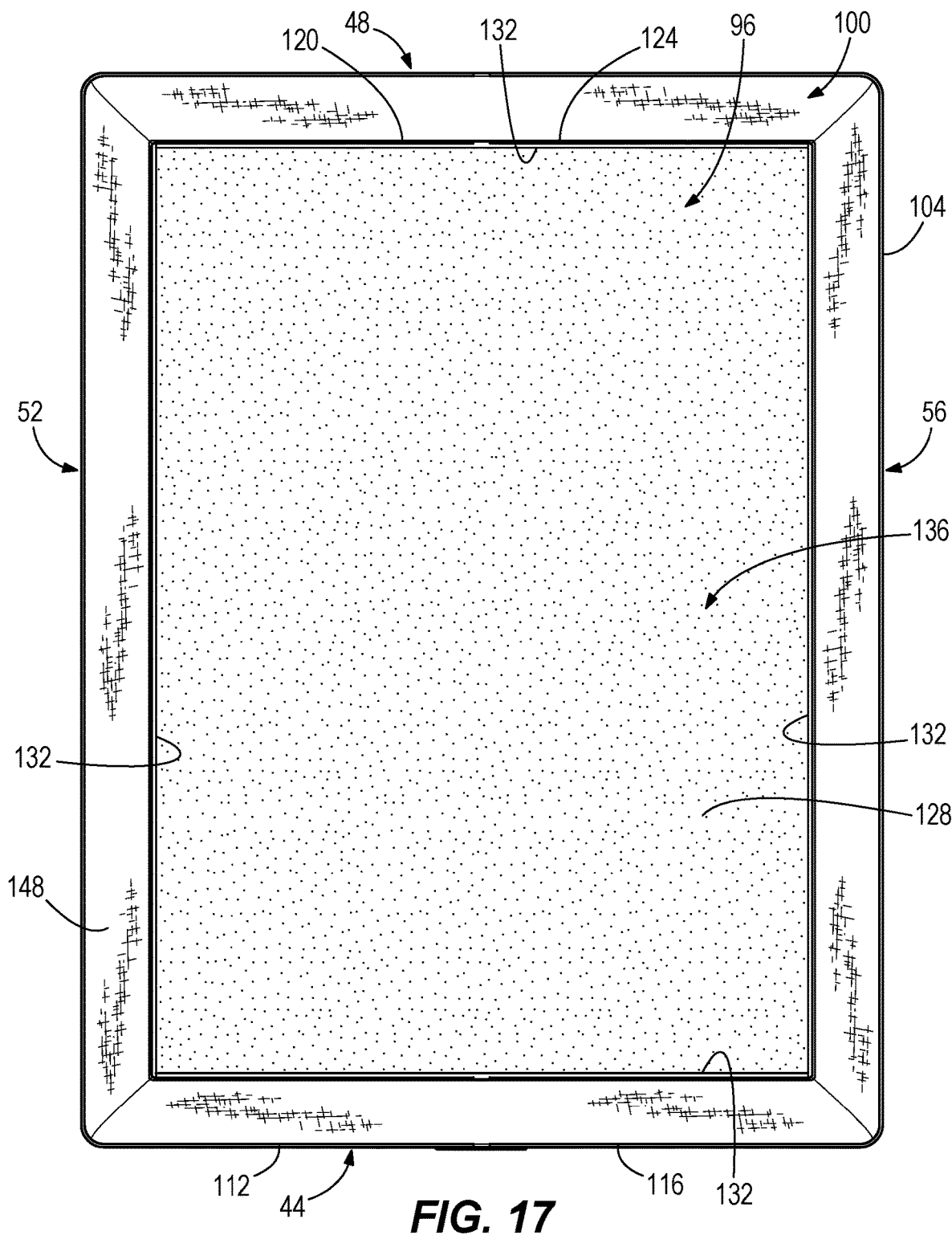
FIG. 17 is a bottom view of the tub, inner liner, and outer liner of FIG. 12.
Figure 18:
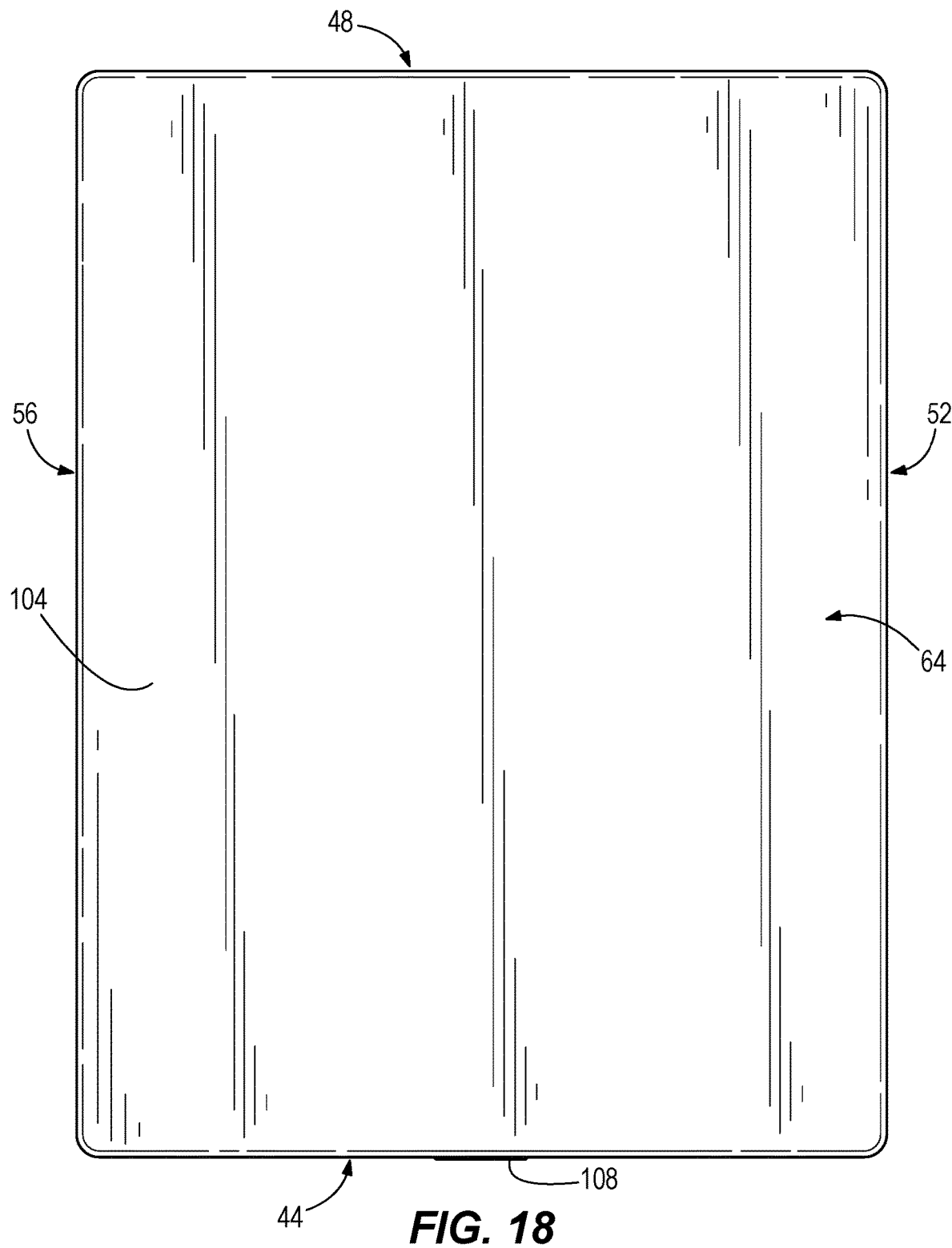
FIG. 18 is a top view of the tub, inner liner, and outer liner of FIG. 12.

As shown in FIG. 11, the inner liner 100 surrounds the tub 96 and includes a top portion 140 and a bottom portion 144. The top portion 140 includes a ledge 148, which extends over the tops of the rails 132 of the tub 96. The ledge 148 does not cover the interior cavity 136 of the tub 96. The first inner zipper 120 and the second inner zipper 124 are stitched to an inner perimeter of the ledge 148. The first zipper 120 and the second zipper 124 are positioned to align with the interior edge or perimeter of the rails 132 (i.e. the perimeter of the interior cavity 136). The top portion 140 and the bottom portion 144 of the inner liner 100 are zippered together by the third inner zipper 152. The bottom portion 144 of the liner 100 extends around the bottom of the base 128 of the tub 96 and upwards over the sides of the rails 132 of the tub 96 to attach with the top portion 140 of the inner liner 100. The third inner zipper 152 allows the tub 96 to be installed within the inner liner 100. With the third inner zipper 152 unzipped, the top portion 140 is installed over the rails 132 of the tub 96 and the bottom portion 144 is wrapped around the base 128 of the tub 96. The third inner zipper 152 is then zipped closed so that the tub 96 is captured within the inner liner 100.

As shown in FIGS. 12-18, the assembled tub 96 and inner liner 100 are inserted into the outer liner 104 so that the first outer zipper 112, the second outer zipper 116, the first inner zipper 120 and the second inner zipper 124 are aligned. That is to say, the first outer zipper 112, the second outer zipper 116, the first inner zipper 120 and the second inner zipper 124 are arranged so that the zippers meet in a central area of the front side 44 of the mattress assembly 40. The outer liner 104 extends around the exterior of the inner liner 100 so that the ledge 148 is exposed and the first inner zipper 120 and the second inner zipper 124 are exposed. In the arrangement shown in FIG. 12-18 with the top cover 68 and the inner cover 72 removed, the end user has access to the interior cavity 136.

Figure 19:
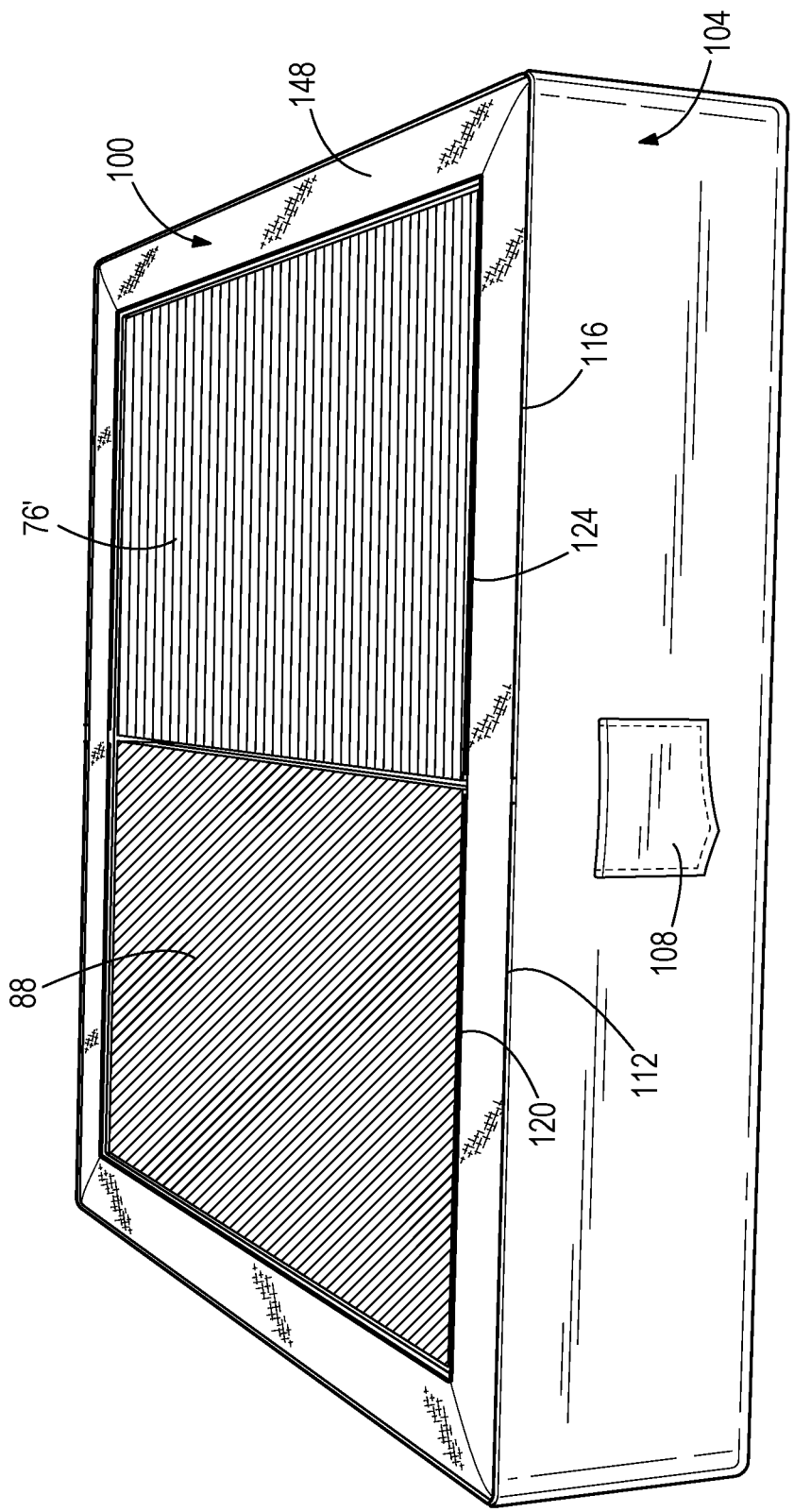
FIG. 19 is a perspective view of the mattress assembly of FIG. 1 with a top cover and inner cover removed.

As shown in FIG. 19, the layers 76-92, 76'-92' are installed into the interior cavity 136 of the tub 96 in a top-to-bottom order dictated by the end user. In the arrangement shown in FIG. 19, the left side has the tight layer 88 positioned on top and the right side has the cool layer 76' positioned on top.

Figure 20:
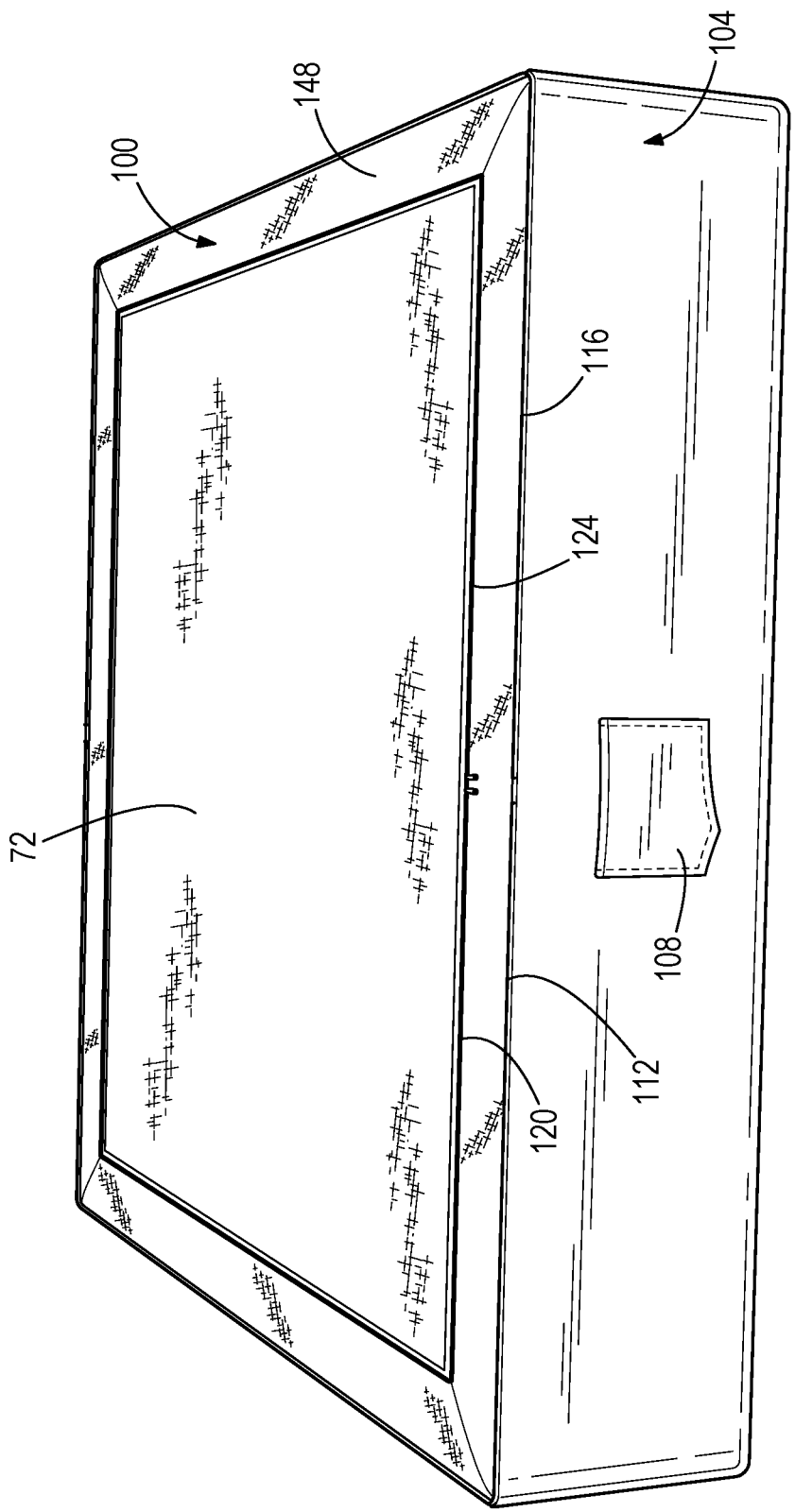
FIG. 20 is a perspective view of the mattress assembly of FIG. 1 with a top cover removed.

As shown in FIG. 20, the inner cover 72 is zipped to the inner liner 100 by the first inner zipper 120 and the second inner zipper 124 to compress the layers 76-92, 76'92' within the interior cavity 136. The first inner zipper 120 and the second inner zipper 124 are aligned with the perimeter of the interior cavity 136 and inhibit stretching at the interface between the layers 76-92, 76'-92' and the tub 96. The inflexibility of the first zipper 120 and the second zipper 124 creates a rigid seam which bridges between the outer rail and the foam layer locking it together and inhibiting separation while a user sits on or otherwise interacts with the mattress assembly. The compression of the zipped inner cover 72 and the inner liner 100 and the positioning of the first inner zipper 120 and the second inner zipper 124 aids the mattress assembly 40 in providing a compact feel. In other words, the mattress assembly 40 does not feel like it is loose or will shift during use. The inner cover 72 extends across the interior cavity 136 of the tub 96 to seal the layers 76-92 into the tub 96. The inner cover 72 does not cover the ledge 148 of the top portion 140 of the inner liner 100. In some embodiments, the inner cover 72 includes a mesh so that the tight layer 88 and the cool layer 76' are still at least partially visible through the inner cover 72. After the inner cover 72 is installed, the top cover 68 can be zipped to the outer liner 104 and the mattress assembly 40 is complete, as shown in FIG. 1.

Figure 21:
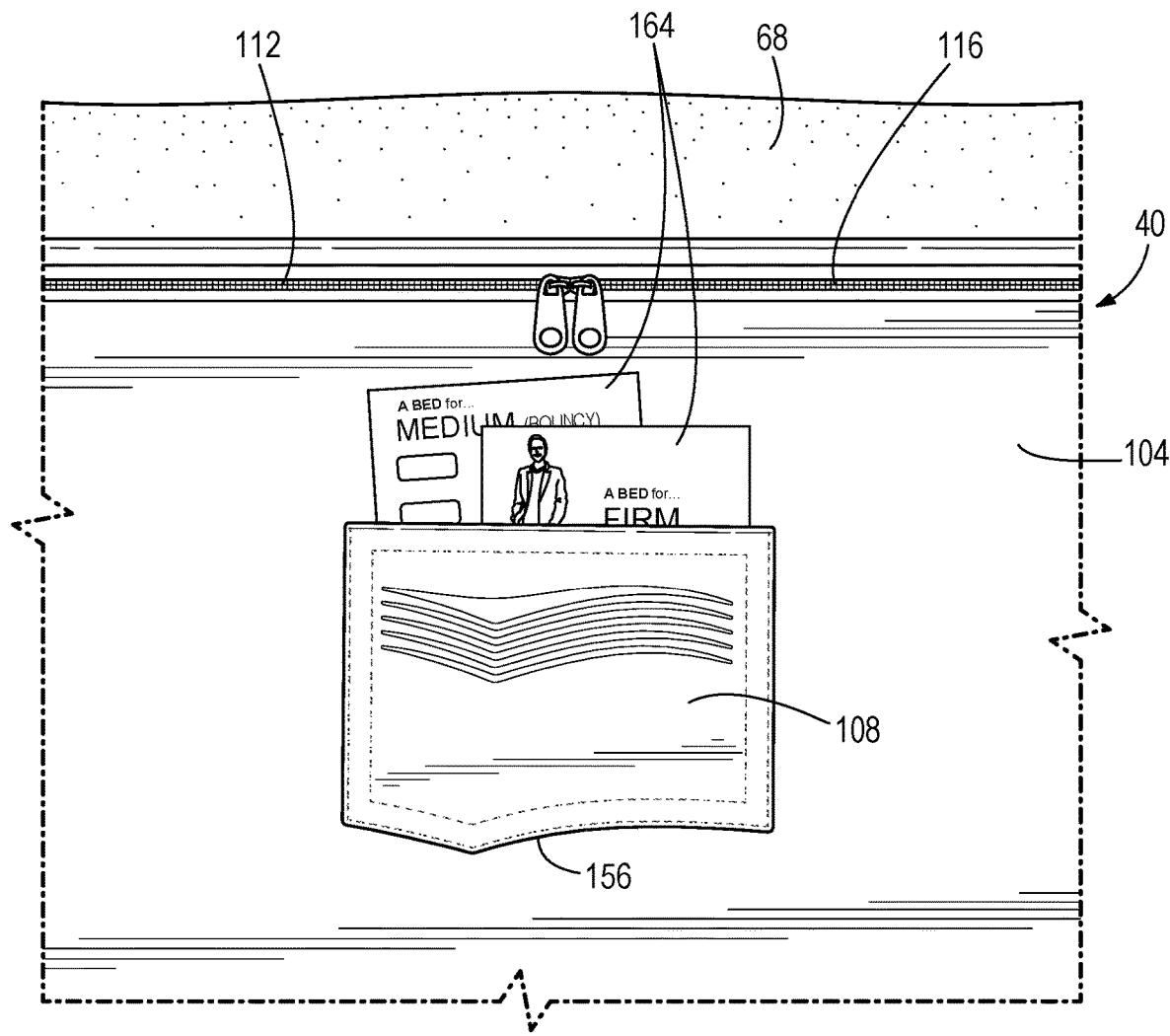
FIG. 21 is a detail view of a pocket of the mattress assembly of FIG. 1.

As shown in FIG. 21, the pocket 108 is attached (e.g., sewn, adhered, fused, etc.) to the outer liner 104 on the front side 44 of the mattress assembly 40. In some embodiments, the pocket 108 has a distinctive shape and includes a shaped bottom portion 156 that includes an arcuate profile. The top portion of the pocket 108 is sized to receive one or more cards 164. The cards 164 depict top-to-bottom orders in which the layers 76-92 should be arranged for a desired feel of the mattress assembly 40. For example, the cards 164 may depict various recipes detailing the arrangement of layers 76-92 to provide varying support levels of the mattress assembly 40. In some embodiments, each card 164 includes a recipe, or a top-to-bottom order, for a desired feel. Exemplary recipes provide a firm and smooshy support, a firm and bouncy support, a medium and smooshy support, a medium and bouncy support, a soft and smooshy support, and a soft and bouncy support. The cards 164 can be placed inside the pocket 108 for convenient access. As discussed above, the layers 76-92, 76'-92' can be arranged in hundreds of top-to-bottom orders. In some embodiments, six cards 164 are supplied with the mattress assembly 40 and include popular recipes. In some embodiments, more than six or less than six cards 164 are included.

Figure 22:
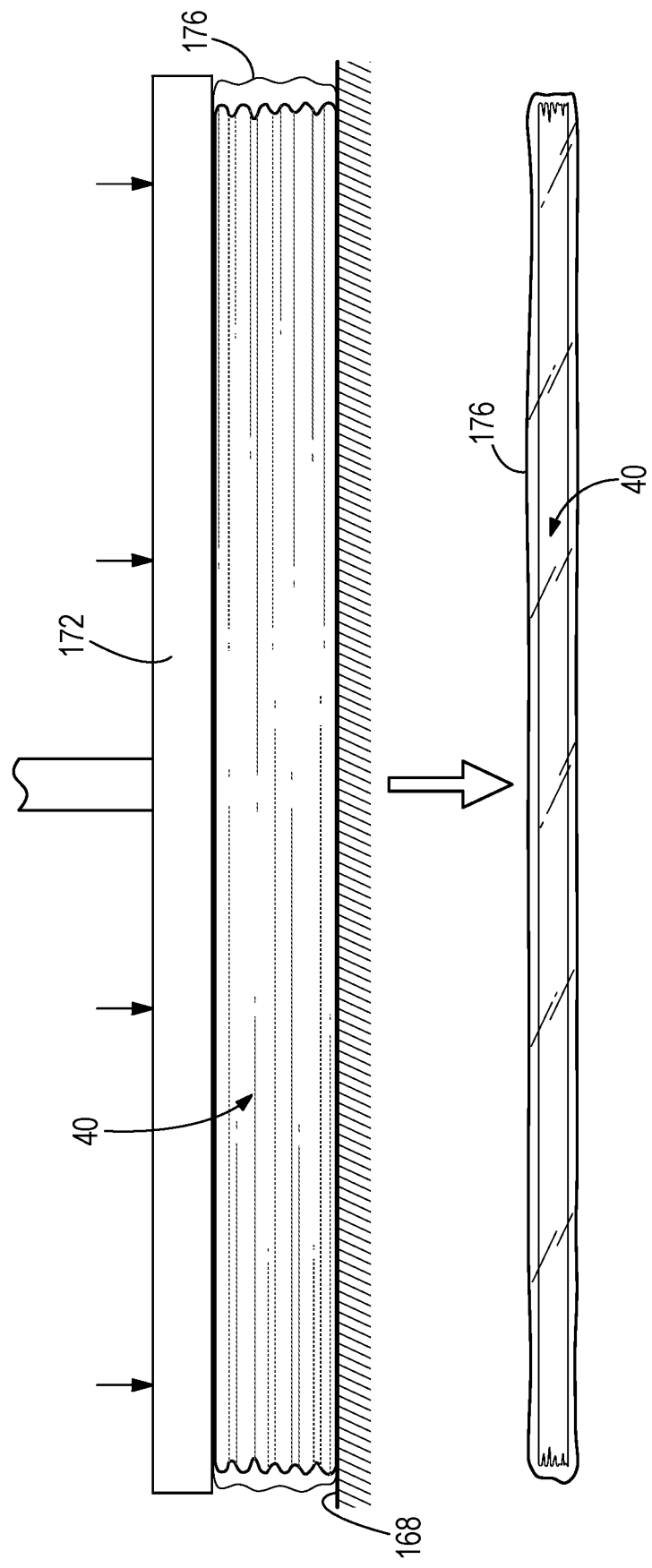
FIG. 22 is a schematic view showing a compression of the mattress assembly of FIG. 1 for packaging.

As shown in FIG. 22, a schematic view showing a compression of the mattress assembly 40 is shown. In the normal state, mattress assembly 40 is expanded and can be quite large. To prepare for shipment of the mattress assembly 40, the mattress assembly 40 is compressed as part of an assembly line in a factory or warehouse. The mattress assembly 40 is placed on a conveyor belt 168 for transport throughout the factory or warehouse. A machine 172 is structured to compress the mattress assembly 40 by moving in a downward motion. In order to maintain the compressed state of the mattress assembly 40, mattress assembly 40 is wrapped and sealed in a plastic film 176. The plastic film 176 may be of a plastic material for vacuum sealing, such as a polyvinylidene chloride and ethylene vinyl alcohol. The plastic film 176 maintains the compressed state of the mattress assembly 40 to prepare the mattress assembly 40 for shipment. After the plastic film 176 is applied, a folding machine is used to fold the mattress assembly 40 lengthwise (i.e., from head to toe), before a rolling machine rolls the folded mattress assembly 40. In some embodiments, the folding machine folds the mattress assembly 40 in half. In some embodiments, a w-fold machine is not desirable because the mattress assembly 40 is stressed so that recovery and use by the end user is less desirable (e.g., the mattress assembly 40 may look disheveled or less professionally assembled). In some embodiments, an additional plastic film is wrapped around the vacuum sealed mattress assembly 40 to provide additional strength and packaging integrity.

Figure 23:
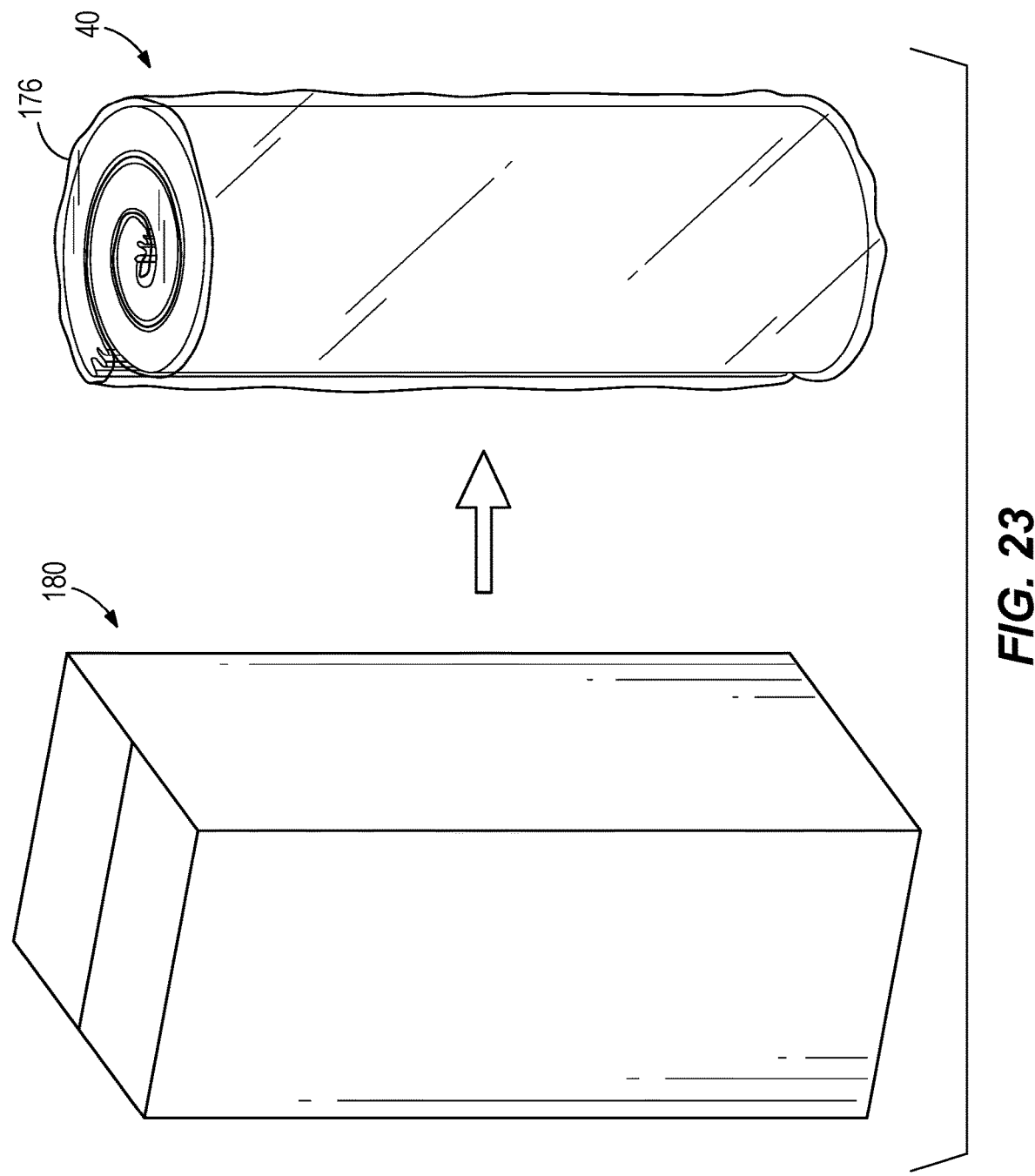
FIG. 23 is a schematic view showing the unpackaging of the mattress assembly of FIG. 1.

As shown in FIG. 23, the compressed and wrapped mattress assembly 40 is placed in a box 180 for shipment to the end user. When the end user receives the box 180, the box is opened and the rolled and vacuum sealed mattress assembly 40 is removed with the mattress assembly 40 sealed within plastic film 176. The mattress assembly 40 may be rolled or folded to fit inside the box 180. The end user then lays the sealed mattress assembly 40 in a desired final location (e.g., on a bed frame) and removes the plastic film 176. The mattress assembly 40 rapidly expands to a use condition (see FIG. 1) and is ready for use by the end user.

Figure 24:
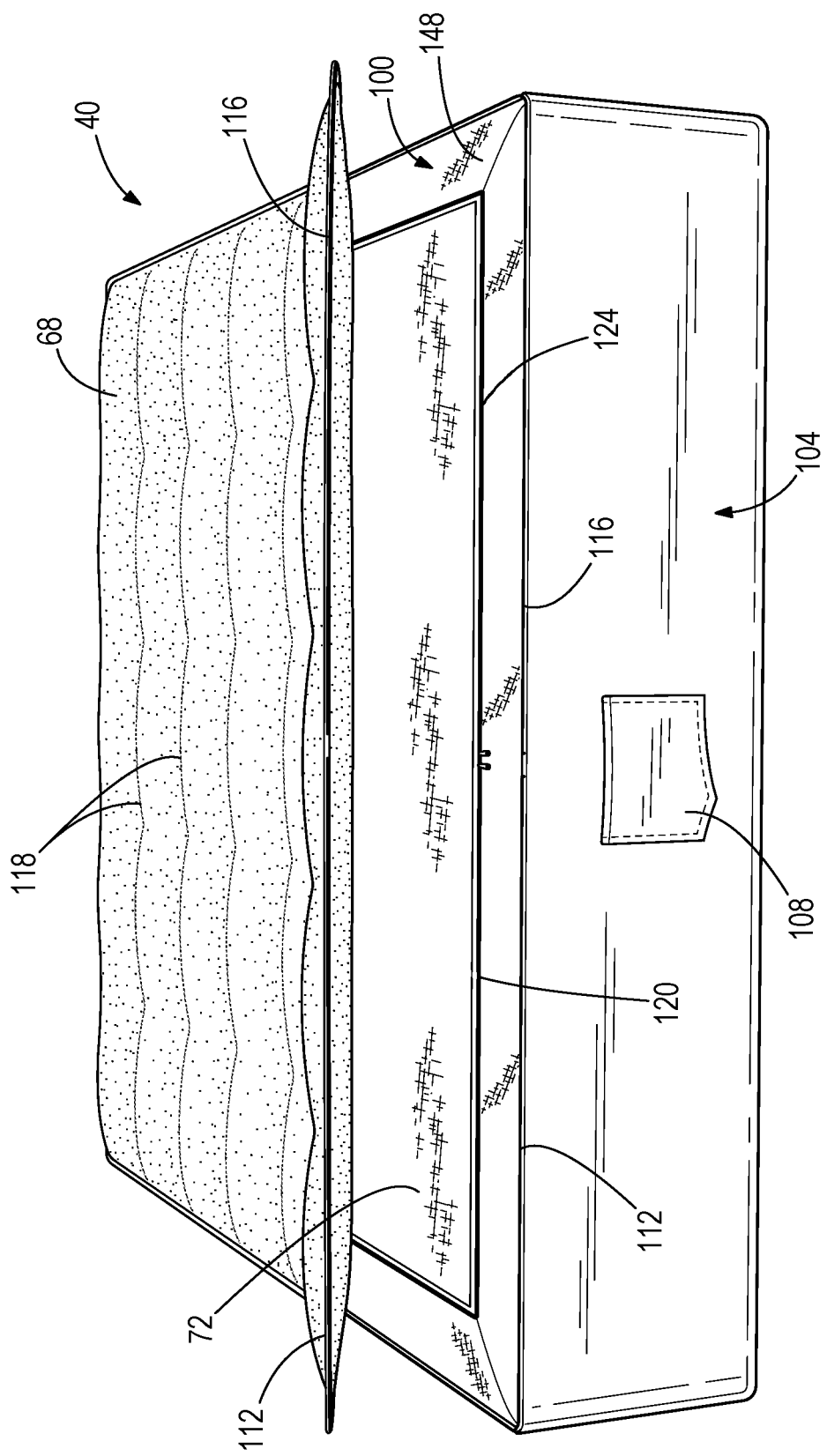
FIG. 24 is a schematic view showing the removal of a top cover of the mattress assembly of FIG. 1.

As shown in FIG. 24, the top cover 68 is unzipped from the outer liner 104 by first outer zipper 112 and second outer zipper 116. Removal of the top cover 68 reveals the inner cover 72 and the inner liner 100.

Figure 25:
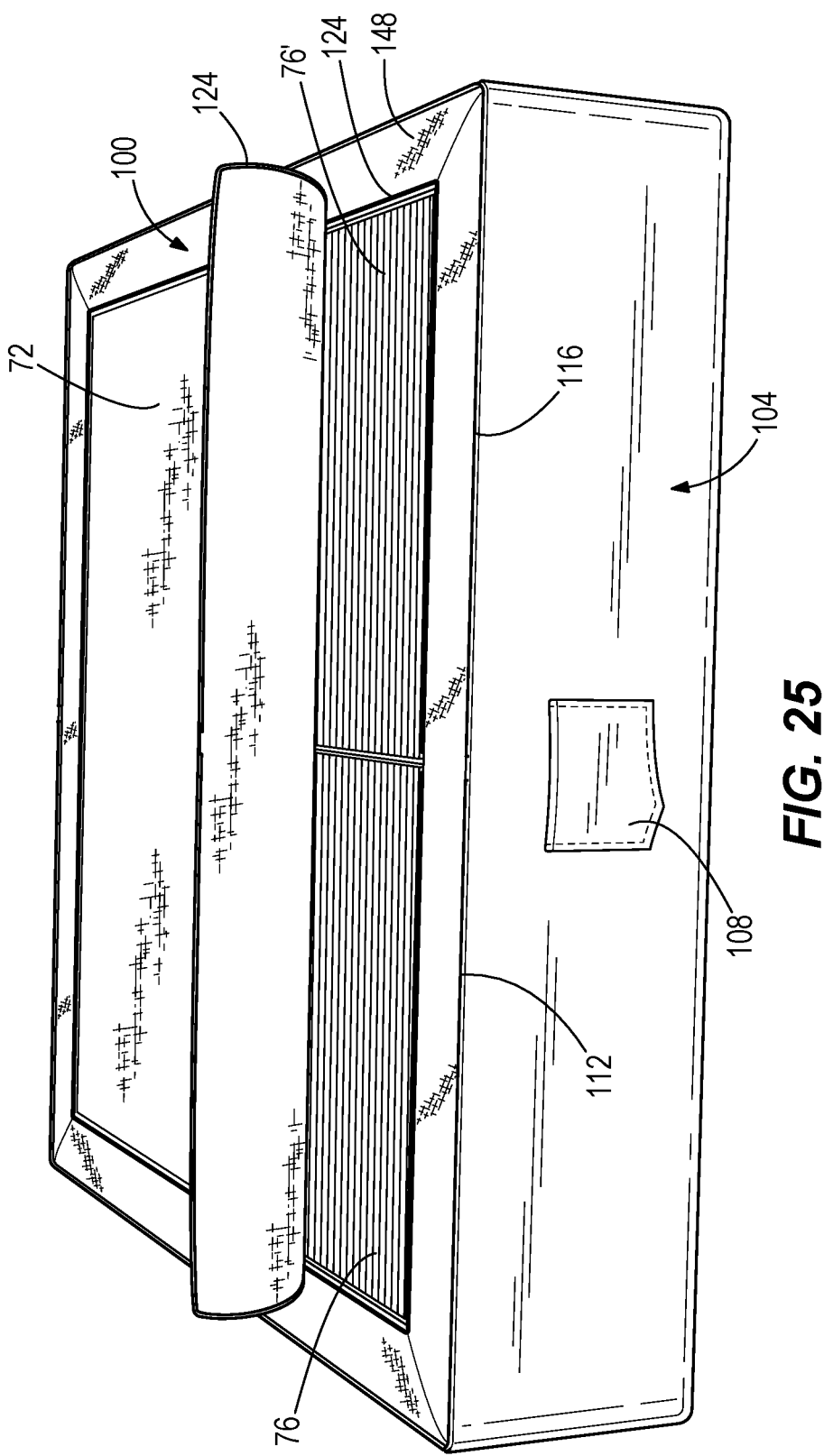
FIG. 25 is a schematic view showing the removal of an inner cover of the mattress assembly of FIG. 1.

As shown in FIG. 25, the inner cover 72 is unzipped from the inner liner 100 by the first inner zipper 120 and the second inner zipper 124. Removal of the inner cover 72 reveals the layers 76-92, 76'-92' located within the interior cavity 136 of the tub 96. The layers 76-92, 76'-92' are accessible so that the end user may rearrange the layers 76-92, 76'-92' to provide a desire feel of the mattress assembly 40.

Figure 26:
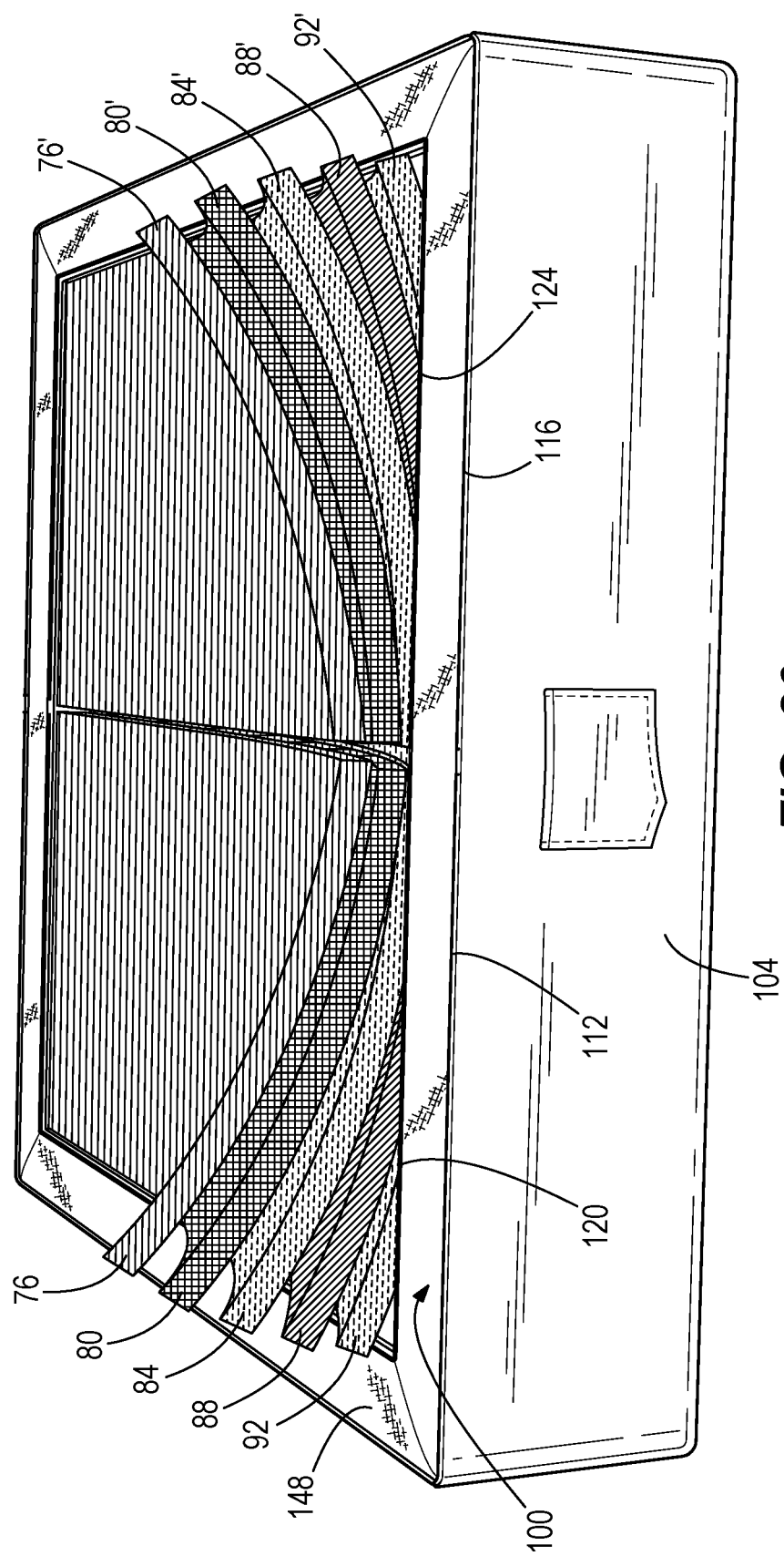
FIG. 26 is a perspective view showing the rearrangeable layers of the mattress assembly of FIG. 1.

As shown in FIG. 26, with the inner cover 72 removed, the layers 76-92, 76'-92' are rearrangeable and may be placed into the interior cavity 136 of the tub 96 in any order. The layers 76-92, 76'-92' are shown in a top-to-bottom order of the cool layer 76, the flex layer 80, the first dream layer 84, the tight layer 88, and the second dream layer 92. The layers 76-92, 76'-92' are easily removed from the tub 96 and rearranged as desired.

The removal of any of the components of the mattress assembly 40 allows for the components to be replaced without needed to replace the entire mattress assembly 40. For example, if the top cover 68 is stained or otherwise damaged, it can be unzipped from the outer liner 104 and replaced with a new top cover 68, ultimately saving the end user from having to purchase an entirely new mattress assembly 40 if only individual components need replacing. Additionally, if the user is not satisfied by the support level provided by the mattress assembly 40, the user may choose to replace some of the components 76-92 for specialty components.

Figure 27:
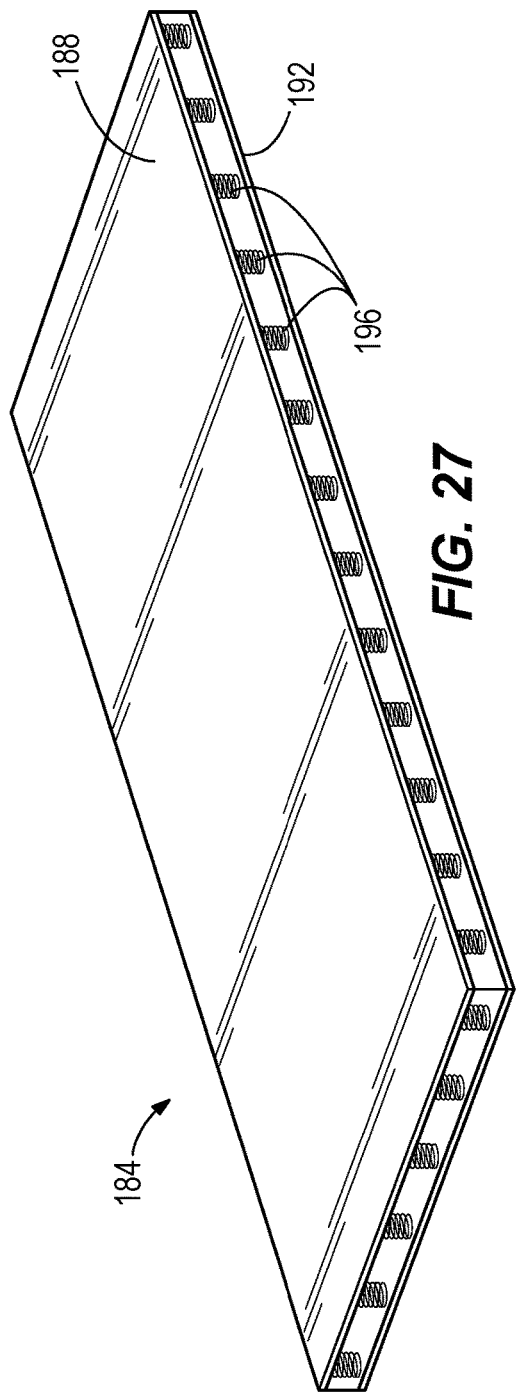
FIG. 27 is a perspective view of a specialty layer according to some embodiments.

As shown in FIG. 27, a specialty layer 184 may be useful if the end user expresses a specific need or desired support level for the mattress assembly 40. For example, an injured user may desire an extremely firm or soft mattress assembly 40. In that case, the user may purchase the specialty layer 184 to replace one or more of the layers 76-92 of the mattress assembly 40. In some embodiments, the specialty layer 184 includes a top 188, a bottom 192, and springs 196 positioned between the top 188 and the bottom 192. The springs 196 in the specialty layer 184 provides the user with a bouncier mattress assembly 40 when the specialty layer 184 is used in replacement of any of the layers 76-92. In some embodiments, the specialty layer 184 defines a thickness of three inches. In some embodiments, the specialty layer defines a thickness of about six inches. In some embodiments, the specialty layer 184 defines a thickness of between about one inch and about seven inches. The layers 76-92 may be arranged to include the specialty layer 184 to provide the desired feel for the end user. In some embodiments, the specialty layer 184 may include a foam not included with the other layers 76-92, a latex material, an air bladder, or another structure, as desired.

Figure 28:
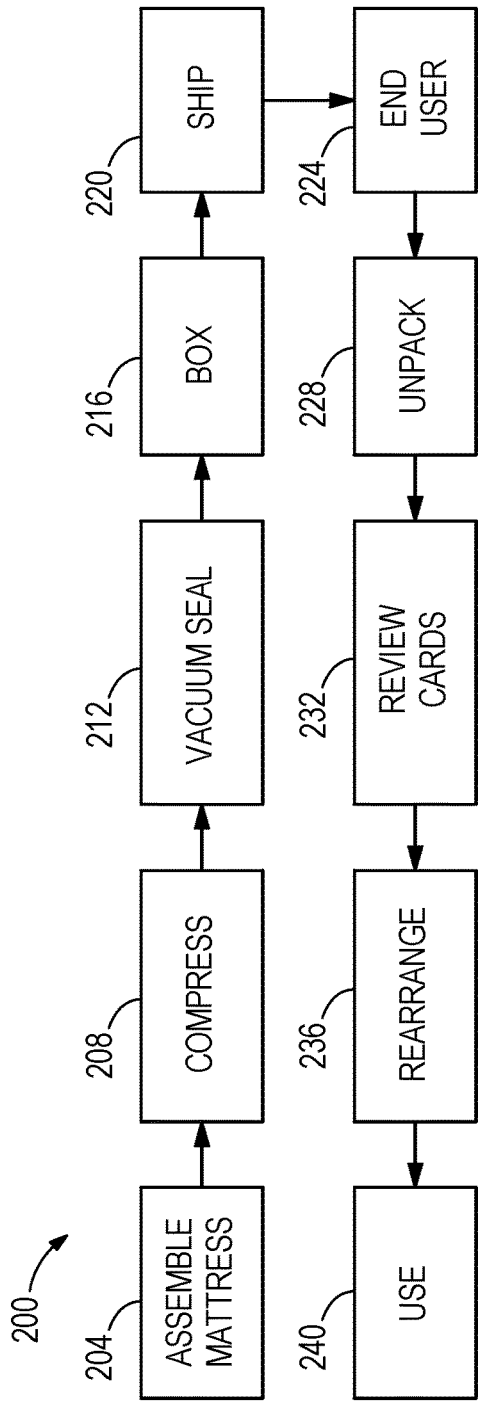
FIG. 28 is a flow diagram of a process for making the mattress assembly of FIG.

As shown in FIG. 28, a flow diagram of a process 200 for making mattress assembly 40 generally includes the steps of assembling the mattress assembly 40 at process block 204, compressing the mattress assembly 40 at process block 208, vacuum sealing the mattress assembly 40 at process block 212, boxing the mattress assembly 40 at process block 216, shipping the mattress assembly 40 at process block 220, an end user receiving the mattress assembly 40 at process block 224, unpacking the mattress assembly 40 at process block 228, reviewing the cards 164 of the mattress assembly 40 at process block 232, rearranging the mattress assembly 40 at process block 236, and using the mattress assembly 40 at process block 240.

At process block 204, the mattress assembly 40 is assembled. In one embodiment, the assembly of mattress assembly 40 may take place at a factory or warehouse. The components of the mattress assembly 40, as shown in FIG. 8, may be manufactured in the factory or warehouse, and may be combined together to form the mattress assembly 40 by machinery or workers of the factory or warehouse. In another embodiment, the components of the mattress assembly 40 may be purchased or received from a variety of vendors, and assembled together at the factory or warehouse. For example, process block 204 may include the steps of inserting the tub 96 into the inner liner 100, zipping the third inner zipper 152, inserting the assembled tub 96 and the inner liner 100 into the outer liner 104, inserting the layers 76-92, 76'-92' into the tub 96, zipping the inner cover 72 to the inner liner 100 by first inner zipper 120 and second inner zipper 124, and finally zipping the top cover 68 to the outer liner 104 by first outer zipper 112 and second outer zipper 116. In some embodiments, the third inner zipper 152 aid in assembly.

At process block 208, the mattress assembly 40 is compressed. An example of compression of the mattress assembly 40 is shown in FIG. 22. For example, in the factory or warehouse, the mattress assembly 40 is moved on conveyor belt 168 underneath the machine 172, which moves downward towards the conveyor belt 168 to compress mattress assembly 40. Mattress assembly 40 is not damaged upon compression at process block 208 and retains the ordering of the covers, layers, and liners as previously described.

At process block 212, the mattress assembly 40 is vacuum sealed. An example of the vacuum sealing of the mattress assembly 40 is shown in FIG. 22. After compression of the mattress assembly 40, the plastic film 176 is sealed around the mattress assembly 40 to retain the mattress assembly 40 in the compressed state. The plastic film 176 maintains the mattress assembly 40 in the compressed state and to provide a protective barrier around the mattress assembly 40 to prevent any damage to the mattress assembly and to prevent any undesirable substances from entering the mattress assembly 40, such as dirt or bacteria. In some embodiments, the plastic film 176 is applied or installed before compression, and the vacuum sealing takes place concurrently with the compression.

At process block 216, the mattress assembly 40 within the plastic film 176 is boxed to prepare for shipment. An example of the boxed version of the mattress assembly 40 is shown in FIG. 23. The mattress assembly 40 is compressed and wrapped with plastic film 176, as described at process blocks 208 and 212. The mattress assembly 40 with the plastic film 176 is then further rolled and/or folded, as necessary, to fit within box 180. Boxing of the mattress assembly 40 is performed by machinery or workers at the factory or warehouse. In some embodiments, more than one mattress assembly 40 is boxed within the same box 180.

At process block 220, the mattress assembly 40 within the box 180 is retrieved from the factory or warehouse, marked for shipment, and shipped to the end user. Shipment of the mattress assembly 40 within the box 180 can take place through any standard form of transport, such as through the United States Postal Service, FedEx, UPS, or may be transported via other cargo methods.

At process block 224, the shipped mattress assembly 40 within the box 180 is received by the end user. The end user may be an individual and the mattress assembly 40 may be received at a private residence such as a house, apartment, or condo unit. Alternatively, the end user may be a company or corporation and the mattress assembly 40 may be received at a facility such as a hospital or a hotel.

At process block 226, the mattress assembly 40 is unpacked from the box 180 by the end user. The end user removes plastic film 176 from the mattress assembly 176. For example, the end user may use a knife or scissors to carefully cut the plastic film 176 and release the mattress assembly 40. After removal of the plastic film 176, the mattress assembly 40 expands from the compressed state that was formed at process block 208. In some embodiments, the mattress assembly 40 is left to rest for a set time period, such as 24 or 48 hours to fully expand before use. After the mattress assembly 40 has been unpacked and fully expanded, the mattress assembly 40 is ready for use.

At process block 232, the end user reviews the cards 164 received with the mattress assembly 40. The cards 164 are shown and described above in reference to FIG. 21. The cards 164 depict an order in which the layers 76-92 should be arrange for a desired feel. For example, the cards 164 may depict various recipes detailing the arrangement of layers 76-92 to provide varying support levels of the mattress assembly 40. The user reviews the cards 164 to see the recipes and selects the card 164 with the desired level of support. The cards 164 are configured to be inserted into the pocket 108 after review for storage and future use.

At process block 236, the end user selects the card 164 with the desired support level, and follows the recipe on the card 164 to arrange the layers 76-92 to match the desired support level. Similarly, a second card 164 may be selected with a different recipe, and the layers 76'-92' may be rearranged to provide the desired feel. In order to access the layers 76-92, 76'-92' the end user unzips the first outer zipper 112 and second outer zipper 116 to remove the top cover 68 from the outer liner 104. The end user then unzips the first inner zipper 120 and the second inner zipper 124 to remove the inner cover 72 from the inner liner 100. After removal of the top cover 68 and the inner cover 72, the end user can access the layers 76-92, 76'-92'. The layers 76-92, 76'-92' may be removed from the interior cavity 136 of the tub 96. The end user can then re-insert the layers 76-92, 76'-92' back in to the interior cavity 136 of the tub 96 according to the selected card 164 or cards 164.

At process block 240, the mattress assembly 40 is used by the end user. The end user has arranged the layers 76-92, 76'-92' of the mattress assembly 40 according to the recipe on the card 164. The mattress assembly 40 is of the desired support level of the end user. The mattress assembly 40 may be used at a private residency, a hospital, a hotel, or in any other setting where mattress is commonly used.

It should be understood that process 200 and process blocks 204-240 may be performed any number of times to any number of mattress assemblies 40. For example, if the end user is a hotel, a large number of mattress assemblies 40 may be desired. Process blocks 204, 208, and 212 may each take place multiple times, with the plurality of mattress assemblies 40 then being packaged into a singular box 176 at process step 216. The box 176 may be shipped at process block 220 to the hotel. If, after use of the mattress assembly 40 at process block 240, the end user is not satisfied with the support level of the mattress assembly 40, the steps at process block 232 and 236 may be redone to select a different card 164. The end user may rearrange the layers 76-92, 76'-92' to match the recipe of the new card 164 to provide a new support level. The examples and embodiments described in relation to process 200 are not meant to be limiting, and it should be understood that process 200 may contain additional steps and that process blocks 204-240 may be performed in other ways.

Figure 29:
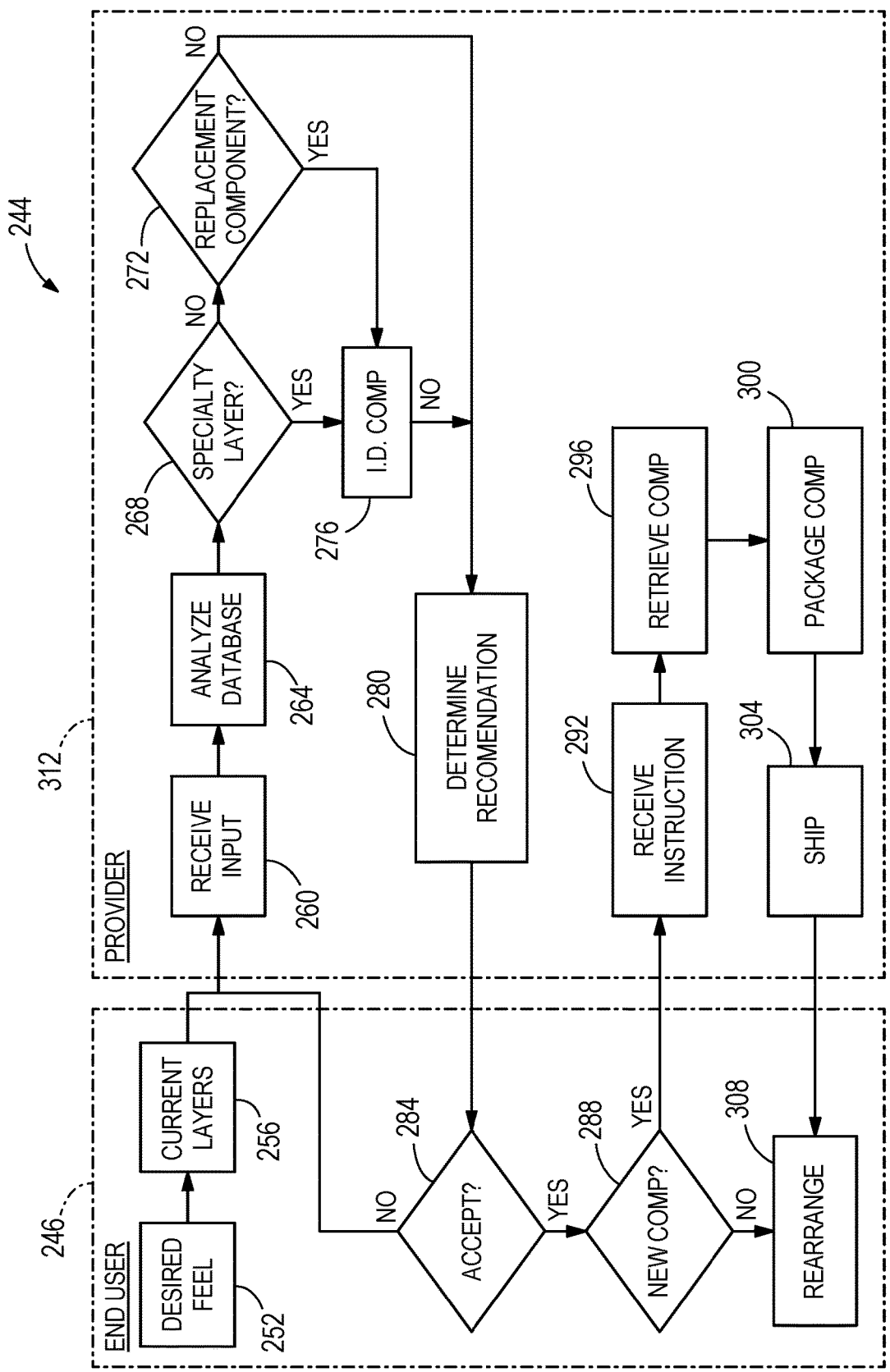
FIG. 29 is a flow diagram of a downstream service process for the mattress assembly of FIG. 1.

Referring now to FIG. 29, a flow diagram of a downstream service process 244 for the mattress assembly 40 is shown, according to an exemplary embodiment. The process 244 provides a method of servicing the mattress assembly 40 after the mattress assembly 40 has been received by an end user 246 (e.g., after the use of process block 240 described above). If the end user 246 is not satisfied with the mattress assembly 40, needs a replacement component, or wants a specialty layer 184, the process 244 works to replace and provide any replacement components to the end user 246 as necessary. The process 244 generally includes the steps of determining a desired feel at process block 252, determining the current layers possessed by the end user 246 at process block 256, receiving input from the end user 246 at process block 260, analyzing a database at process block 264, determining if a specialty layer 184 is needed at process block 268, determining if a replacement component is needed at process block 272, identifying the replacement component or specialty layer 184 at process block 276, determining a recommendation at process block 280, the end user 246 contemplating the recommendation at process block 284, determining is a replacement component or specialty layer 184 is included in the recommendation at process block 288, receiving instructions at process block 292, retrieving the replacement component at process block 296, packaging the replacement component at process block 300, shipping the replacement component at process block 304, and rearranging the mattress assembly 40 at process block 308.

At process block 252, the end user 246 determines a desired feel of the mattress assembly 40. The end user 246 may not be satisfied with the level of support that the mattress assembly 40 is currently providing, and may have a different desired feel. For example, if the end user 246 has recently stayed at a hotel with a different type of mattress and was very satisfied with the level of support of the mattress at the hotel, the end user 246 may desire to arrange the layers 76-92 of the mattress assembly 40 in such a way to mimic the mattress of the hotel. The end user 246 can take note of the type of mattress at the hotel. In some embodiments, the end user 246 may have damaged one of the layers 76-92 so that the mattress assembly 40 does not retain the same support level, and the end user 246 may wish to replace the damaged layer. In some embodiments, one of the layers 76-92 may experience normal wear and tear and the end user 246 may wish to have the layer 76-92 replaced. In some embodiments, the end user 246 may determine a desired feel in relative terms. For example, the end user 246 may use relative terms such as softer, firmer, much softer, slightly softer or other related terms to indicate the desired feel.

At process block 256, the end user 246 determines the current layers that are used in the mattress assembly 40, and how the layers are arranged. In some embodiments, the current layers include layers 76-92, 76'-92' and may include a number of specialty layers 184. The end user 246 also determines the current arrangement of the layers 76-92 and any specialty layers 184 used in the mattress assembly 40. The end user 246 may send information relating to a desired feel of the mattress assembly 40, the current layers 76-92 and specialty layers 184 used in the mattress assembly 40, and the current arrangement of the layers 76-92 and specialty layers 184 to a provider 312. In some embodiments, the end user 246 may input the information into an automated online system maintained by the provider 312. In some embodiments, the end user 246 may call the provider 312 to provide the information. In some embodiments, the end user 246 can scan a QR code, barcode, or other indicator that will directly provide current layers or arrangement to the provider 312. In some embodiments, the provider 312 already possesses knowledge of the current layers in a database linked to the end user's 246 name, username, or identifier (e.g., a tag, a number, a code, etc.).

At process block 260, input from the end user 246 is received by the provider 312. The input from the end user 246 may be received automatically from an online system or database. The input received by the provider 312 relates to a desired feel of the mattress assembly 40 and to the current arrangement of the layers 76-92 and any specialty layers 184 used in the mattress assembly 40. The input from the end user 246 can also include information such as the type of mattress used in a hotel of which the end user 246 desires the same feel from the mattress assembly 40 or any other input regarding a desired feel. The input from the end user 246 can also include information relating to if any of the components of the mattress assembly 40 have been damaged and need to be replaced, allergy information, personal attributes of the end user 246 (e.g., height and weight, preferred sleeping position, gender, etc.), desired products (e.g., natural vs. synthetic), or other features that are important to the end user 246.

At process block 264, the input received from the end user 246 is analyzed within a database. The database may include such information as level of support provided by the various layers 76-92 and specialty layers 184 and the correct arrangement of the layers 76-92 and specialty layers 184 to provide the desired level of support. The database may include pre-existing information relating to the end user 246, such as the components of the mattress assembly 40 that the end user 246 already has as well as any specialty layers 184 that the end user 246 may have already purchased. The database may also include previous contacts or inputs received from the end user 246. Additionally, the database may include information relating to other types of mattresses and how to recreate the support level and feel of these mattresses by rearranging the layers 76-92 and specialty layers 184. At process block 264, the input received from the end user 246 is analyzed within the database to determine both the layers 76-92 and specialty layers 184 needed to provide the desired feel of the mattress assembly 40 to the end user 246, in addition to the necessary arrangement of the layers 76-92 and the specialty layers 184.

At process block 268, it is determined if a new specialty layer 184 is needed to obtain the desired feel of the mattress assembly 40. The provider 312 reviews the input received by the end user 246 and analyzes the database to determine if a new specialty layer 184 is needed to provide the desired feel of the mattress assembly 40. If a specialty layer 184 is needed, process 248 advances to process block 276.

At process block 272, if there is no specialty layer 184 needed to obtain the desired feel of the mattress assembly 40, it is then determined if a replacement component 272 is needed. The provider 312 analyzes the input received from the end user 246 to determine if a replacement component is needed for the mattress assembly 40. For example, one of the layers 76-92 may be damaged and need to be replaced. Additionally, one of the other components of the mattress assembly 40, such as the top cover 68, may have ripped or been otherwise damaged and the end user 246 might desire a new top cover 68. This information would be included in the input received from the end user 246. If no replacement component for the mattress assembly 40 is needed, process 248 advances to process block 280.

At process block 276, a new component consisting of either a new specialty layer 184 or a replacement component is identified. If a new specialty layer 184, new layer 72-96, or other replacement component for the mattress assembly 40 is needed, as determined at process blocks 268 and 272, the provider 312 uses the database to determine an identification of the replacement component. In some embodiments, there may be multiple replacement components, consisting of one or more specialty layers 184, one or more layers 76-92, and/or other components. An identification of the replacement component(s) may consist of a product number that is stored in the database. The identification may also consist of a purchase price of the replacement component(s).

At process block 280, the provider 312 determines a recommendation for the end user 246. In some embodiments, determining the recommendation includes querying a database using the input received from the end user 246 (e.g., a desired feel and current layers). The recommendation consists of information regarding the replacement component(s) needed to provide the desired feel for the mattress assembly 40. The recommendation further includes information regarding how to arrange the layer 76-92 to provide the end user 246 with the desired feel. In some embodiments, the recommendation is automatically sent to the end user 246 at process block 280. In some embodiments, the recommendation is produced using an algorithm. In some embodiments, the algorithm receives a current arrangement of the end user's 246 mattress assembly, and any information regarding the desired feel (e.g., subjective input, and/or a specific mattress that was desirable) and determines the recommendation using a weighted value assigned to subjective terms, or by referencing statistics about a specific mattress from a database.

At process block 284, the end user 246 determines if the recommendation will be accepted. The end user 246 may review the information regarding the recommended replacement component(s) and the recommended arrangement of layers 76-92 and determine if they are satisfactory. For example, the end user 246 may view the recommended replacement component(s) and the cost of the recommended replacement component(s) to determine if the end user 246 is willing to purchase the recommended replacement component(s). The end user 246 will either accept or reject the recommendation. In one embodiment, the end user 246 may accept a portion of the recommendation, such as a recommended arrangement of the layers 76-92, but may reject another portion of the recommendation, such as a recommended replacement component of a new top cover 68. If the recommendation is not accepted, the process 248 returns to process block 260 and a new recommendation is determined.

At process block 288, the end user 246 determines if a replacement component(s) is necessary as part of the recommendation. If no new component is needed, the process 248 advances to process block 308.

At process block 292, the provider 312 receives the instruction that the end user 246 252 has accepted the recommendation and desires the replacement component(s).

At process block 296, the provider 312 instructs the factory or warehouse to retrieve the identified replacement component(s). The factory or warehouse then retrieves the replacement component(s). The provider 312 may use the database to determine the location of the replacement component(s) within the warehouse or factory. In some embodiments, the replacement component(s) may be retrieved from a third-party vendor and may need to be specially ordered for the end user 246.

At process block 300, the provider 312 packages the replacement component(s). The packaging of the replacement component(s) may be done as shown and described in reference to FIG. 22. The replacement component(s) are compressed, such as by machine 172, sealed with a plastic film 176, and inserted into a box 180. In some embodiments, the packaging is done by the provider 312, the factory or warehouse, or a third-party vendor.

At process block 304, the box(es) 180 containing the replacement component(s) are shipped to the end user 246. The shipment of the box(es) may be done as described in reference to process block 220 of process 200 in FIG. 28.

At process block 308, the end user 246 rearranges the mattress assembly 40 to provide the desired feel. The end user 246 may remove the layers 76-92, 76'-92', as previously described. The layers 76-92, 76'-92' can then be reinserted in the necessary arrangement, as given by the recommendation from the provider 312, to provide the desired feel. Any replacement component(s) that the end user 246 has received from the provider 312 can be used with the mattress assembly 40 and arranged with the existing layer 76-92, 76'-92' and specialty layers 184 as needed.

Figure 30:
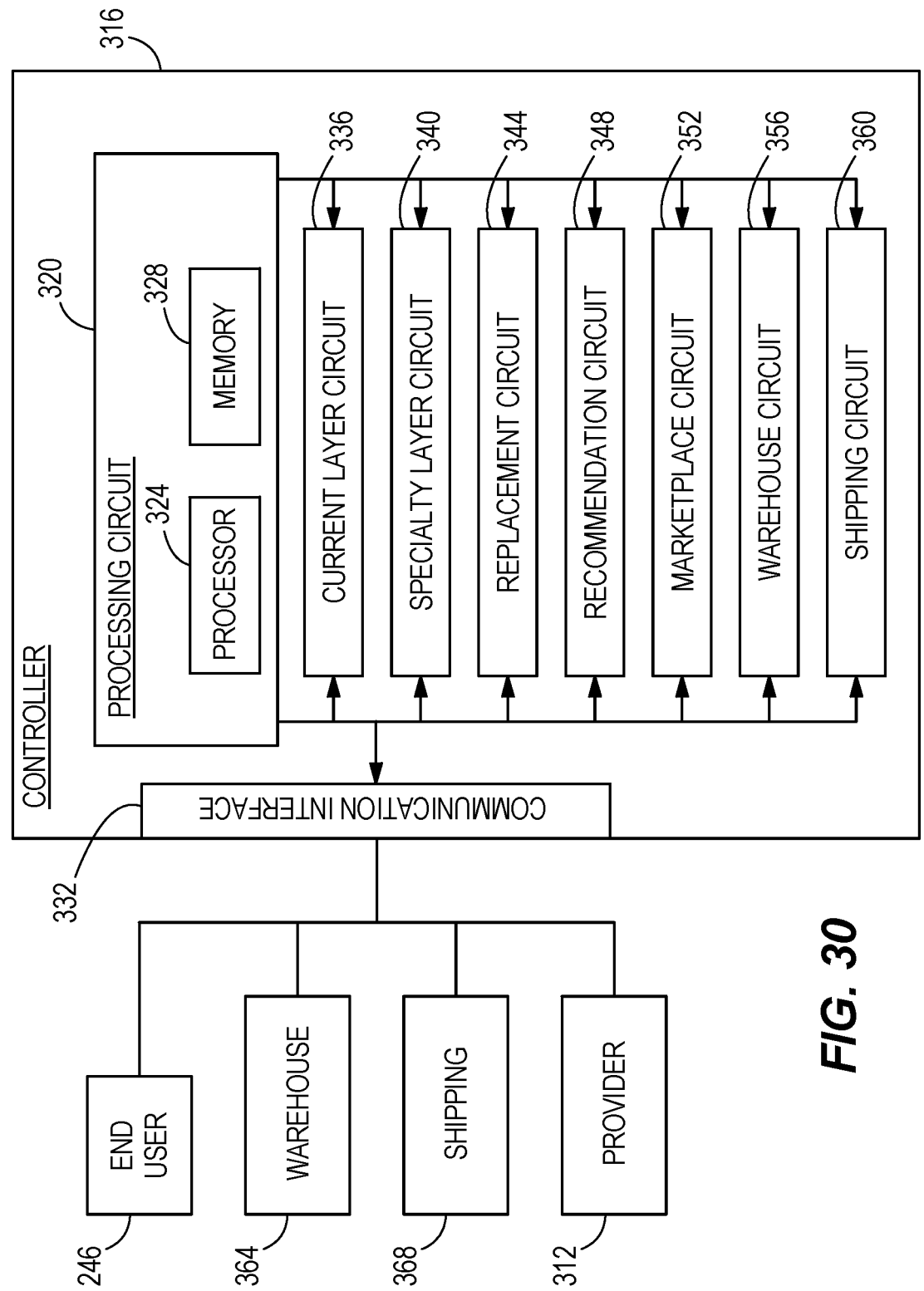
FIG. 30 is a schematic of a controller structured to provide service to an end user of the mattress assembly of FIG. 1.

As shown in FIG. 30, in some embodiments, some or all of the process 248 shown in FIG. 29 is accomplished with a controller 316 that includes a processing circuit 320 having a processor 324 and a memory device 328, a communications interface 332, and a plurality of circuits 336-360. Generally, the controller 316 is structured to perform a downstream service process to provide an end user 246 with a desired configuration of the mattress assembly 40.

In one configuration, the circuits 336-360 are embodied as machine or computer-readable media that is executable by a processor, such as processor 324. As described herein and amongst other uses, the machine-readable media facilitates performance of certain operations to enable reception and transmission of data. For example, the machine-readable media may provide an instruction (e.g., command, etc.) to, e.g., acquire data. In this regard, the machine-readable media may include programmable logic that defines the frequency of acquisition of the data (or, transmission of the data). The computer readable media may include code, which may be written in any programming language including, but not limited to, Java or the like and any conventional procedural programming languages, such as the "C" programming language or similar programming languages. The computer readable program code may be executed on one processor or multiple remote processors. In the latter scenario, the remote processors may be connected to each other through any type of network (e.g., CAN bus, etc.).

In another configuration, the circuits 336-360 are embodied as hardware units, such as electronic control units. As such, the circuits 336-360 may be embodied as one or more circuitry components including, but not limited to, processing circuitry, network interfaces, peripheral mattress assemblies, input mattress assemblies, output mattress assemblies, sensors, etc. In some embodiments, the circuits 336-360 may take the form of one or more analog circuits, electronic circuits (e.g., integrated circuits (IC), discrete circuits, system on a chip (SOCs) circuits, microcontrollers, etc.), telecommunication circuits, hybrid circuits, and any other type of "circuit." In this regard, the circuits 336-360 may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on). The circuits 336-360 may also include programmable hardware mattress assemblies such as field programmable gate arrays, programmable array logic, programmable logic mattress assemblies or the like. The circuits 336-360 may include one or more memory device for storing instructions that are executable by the processor(s) of the circuits 336-360. The one or more memory device and processor(s) may have the same definition as provided below with respect to the memory device 328 and processor 324. In some hardware unit configurations, the circuits 336-360 may be geographically dispersed. Alternatively and as shown, the circuits 336-360 may be embodied in or within a single unit/housing, which is shown as the controller 316.

In the example shown, the controller 316 includes a processing circuit 320 having a processor 324 and a memory device 328. The processing circuit 320 may be structured or configured to execute or implement the instructions, commands, and/or control processes described herein with respect to the circuits 336-360. The depicted configuration represents the circuits 336-360 as machine or computer-readable media. However, as mentioned above, this illustration is not meant to be limiting as the present disclosure contemplates other embodiments where the circuits 336-360, or at least one circuit of the circuits 336-360, is configured as a hardware unit. All such combinations and variations are intended to fall within the scope of the present disclosure.

The processor 324 may be implemented as one or more general-purpose processor, an application specific integrated circuit (ASIC), one or more field programmable gate arrays (FPGAs), a digital signal processor (DSP), a group of processing components, or other suitable electronic processing components. In some embodiments, the one or more processors may be shared by multiple circuits (e.g., circuits 336-360 may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. All such variations are intended to fall within the scope of the present disclosure. The memory device 328 (e.g., RAM, ROM, Flash Memory, hard disk storage, etc.) may store data and/or computer code for facilitating the various processes described herein. The memory device 328 may be communicably connected to the processor 324 to provide computer code or instructions to the processor 324 for executing at least some of the processes described herein. Moreover, the memory device 328 may be or include tangible, non-transient volatile memory or non-volatile memory. Accordingly, the memory device 328 may include database components, object code components, script components, or any other type of information structure for supporting the various activities and information structures described herein.

A current layer circuit 336 is structured to determine the current order of the layers 76-92 within the mattress assembly 40. For example, an end user 246 may provide input regarding the current ordering of the layers 76-92 and what layers 76-92 or specialty layers 184 the user current possesses. The current layer circuit 336 receives the user input through the communications interface 332. In some embodiments, the current layer circuit 336 receives all user input including other factors such as desired feel, a specific mattress that the end user 246 would like to replicate, end user 246 weight or other personal attributes, preferred sleeping position, etc.

The specialty layer circuit 340 is structured to determine a necessary specialty layer 184 for the mattress assembly 40. For example, an end user 246 may provide input regarding a current specialty layer 184 in use with the mattress assembly 40 through the communications interface 332 in addition to a desired level of the support of the mattress assembly 40. If the desired level of support does not align with the current ordering of the layers 76-92 and any current specialty layers 184, the specialty layer circuit 340 may analyze and determine a recommendation for a new specialty layer 184.

The replacement circuit 344 is structured to determine if a replacement component(s) for the mattress assembly 40 is desired. For example, an end user 246 may provide input regarding a desired level of support of the mattress assembly 40 and if any new components are desired. The replacement circuit 344 analyzes the end user 246 input to determine if any replacement components are necessary to provide the desired level of support. Additionally, the replacement circuit 344 analyzes the end user 246 input to determine if any of the components of the mattress assembly 40 are damaged and need to be replaced.

The recommendation circuit 348 is structured to determine a recommendation regarding the ordering of layers 76-92 of the mattress assembly 40, any necessary specialty layers 184, and/or replacement components. The recommendation circuit 348 is structured in communication with the current layer circuit 336 to receive the user input, the specialty layer circuit 340 to receive the recommendation of a new specialty layer 184, and the replacement circuit 344 to receive the recommendation of a replacement component. The recommendation circuit 348 analyzes and optimizes the information to determine an end user 246 recommendation regarding the mattress assembly 40 that includes a recommended top-to-bottom order of layers 76-92 and/or specialty layers 184, and/or a new replacement component. The recommendation circuit 348 conveys the recommendation to the end user 246 via the communications interface 322.

The marketplace circuit 352 is structured to manage an interaction between the end user 246 and the provider 312. For example, the marketplace circuit 352 can provide monetary exchange between the end user 246 and the provider 312. The end user 246 may accept the recommendation given by the recommendation circuit 348 and may desire to purchase additional layers or replacement components for the mattress assembly 40. The marketplace circuit 352 facilitates the monetary exchange, which may be online or may be physical payments directly from the end user 246. The marketplace circuit 352 may also interact with a third-party vendor to facilitate monetary exchange if a purchase is necessary from a third-party vendor. The marketplace circuit 352 conveys information between the end user 246 and the provider 312 regarding acceptance or return of the components and the payments. In addition to operating various portions of the process 244 shown in FIG. 29, the marketplace circuit 352 may provide an interface for ordering a wholly new mattress assembly 40.

The warehouse circuit 352 is structured to communicate with a warehouse 364 and prompt the assembly and packaging of the mattress assembly 40 or individual components (e.g., replacement components, specialty layers 184, etc.). For example, the warehouse circuit 352 may receive input from the warehouse 364 regarding components that are located within the warehouse 364 or information from the recommendation circuit 348 regarding the ordering of the layers 76-92 and specialty layers 184 necessary for the mattress assembly 40. The warehouse circuit 352 may convey instructions to the warehouse 364 about which layers 76-92 and specialty layers 184 are required in the mattress assembly 40. In some embodiments, necessary components of the mattress assembly 40 may be located in a plurality of warehouses 364. The warehouse circuit 352 can receive information from the plurality of warehouses 364 and optimize the process of assembling the components to be shipped by providing instructions to the warehouses 364 regarding location of the components.

The shipping circuit 360 is structured to communicate with a shipping vendor 368 and to prompt the shipment of the mattress assembly 40 or individual components. The shipping circuit 360 may receive input from the end user 246 or the warehouse 364 about a desired shipment location. The shipping circuit 360 may convey instructions to the shipping vendor 368 regarding shipment pickup and delivery locations. For example, if the end user 246 requires multiple mattress assemblies 40, such as at a hotel, the shipping circuit 360 may optimize the shipment such that it is delivered in bulk. The shipping circuit 360 conveys such information to the warehouse 364 and the shipping vendor 368.

In some embodiments, the end user 246 may interact with other end users either directly or indirectly to improve their sleep comfort and experience. In some embodiments, end users may fill out a survey or a learning (e.g., artificial intelligence) interactive form to provide an input to the database that can be used by a community of end users. In some examples, users may enter subjective factors (e.g., preference for a soft mattress, a squishy mattress, a firm mattress) and the layer arrangement that has successfully provided comfort in their specific situation. In some examples, end users may enter arrangements and/or specialty layers that successfully addressed a specific requirement (e.g., an injury, a sore back, a sudden change in health, etc.). Populating the database with information gathered from the community of end users can be used to provide individual end users with suggestions, recommendations, or unprompted offers to address desires of the individual end users over time. This may provide individual end users with an improved sleep solution over time or maintain their current comfort levels over time.

The mattress assembly 40 and processes described herein provide a number of advantages. The layers 76-92 are entirely rearrangeable in a way that eliminates the separate core layer and comfort layer of more traditional mattresses. The layers 76-92 are not laminated together and can be arranged in a large number of arrangements to provide a fully customizable feel. The end user 246 is not stuck with a permanent structural core layer that they cannot change. In other words, the full depth of the mattress assembly 40 is adjustable. The rails 132 of the tub 96 extend the full height of the mattress and provide a pleasant feel when the end user 246 sits on the edge of the mattress assembly 40. The layers 76-92, 76'-92' and the tub 96 are inhibited from separating or partially becoming misaligned because the inner liner 100 and the inner cover 72 maintain the interior components under compression. The assembled outer liner 104 and inner liner 100 also improve the mattress assemblies 40 ability to re-expand after shipping and unpackaging while looking presentable and properly assembled to the end user 246. The downstream servicing of the mattress assembly 40 provides the end user 246 with ongoing support and the ability to maintain their comfort as they age, as components wear, or as their needs change. In some embodiments, the mattress assembly 40 replaces the depreciating asset that a standard mattress provides, with a maintainable investment that provides high quality and adaptable sleep ongoing over time.

No claim element herein is to be construed under the provisions of 35 U.S.C. § 112(f), unless the element is expressly recited using the phrase "means for."

For the purpose of this disclosure, the term "coupled" means the joining or linking of two members directly or indirectly to one another. Such joining may be stationary or moveable in nature. For example, a propeller shaft of an engine "coupled" to a transmission represents a moveable coupling. Such joining may be achieved with the two members or the two members and any additional intermediate members. For example, circuit A communicably "coupled" to circuit B may signify that the circuit A communicates directly with circuit B (i.e., no intermediary) or communicates indirectly with circuit B (e.g., through one or more intermediaries).

While various circuits with particular functionality are shown in FIGS. 1-30, it should be understood that the controller 316 may include any number of circuits for completing the functions described herein. For example, the activities and functionalities of the circuits 336-360 may be combined in multiple circuits or as a single circuit. Additional circuits with additional functionality may also be included. Further, the controller 316 may further control other activity beyond the scope of the present disclosure.

As mentioned above and in one configuration, the "circuits" may be implemented in machine-readable medium for execution by various types of processors, such as processor 324 of FIG. 30. An identified circuit of executable code may, for instance, comprise one or more physical or logical blocks of computer instructions, which may, for instance, be organized as an object, procedure, or function. Nevertheless, the executables of an identified circuit need not be physically located together, but may comprise disparate instructions stored in different locations which, when joined logically together, comprise the circuit and achieve the stated purpose for the circuit. Indeed, a circuit of computer readable program code may be a single instruction, or many instructions, and may even be distributed over several different code segments, among different programs, and across several memory mattress assemblies. Similarly, operational data may be identified and illustrated herein within circuits, and may be embodied in any suitable form and organized within any suitable type of data structure. The operational data may be collected as a single data set, or may be distributed over different locations including over different storage mattress assemblies, and may exist, at least partially, merely as electronic signals on a system or network.

While the term "processor" is briefly defined above, the term "processor" and "processing circuit" are meant to be broadly interpreted. In this regard and as mentioned above, the "processor" may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

Although the diagrams herein may show a specific order and composition of method steps, the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. All such modifications are intended to be included within the scope of the present disclosure as defined in the appended claims. Such variations will depend on the machine-readable media and hardware systems chosen and on designer choice. All such variations are within the scope of the disclosure.

As utilized herein, the terms "approximately", "about", "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

Accordingly, the present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

What is claimed is:

1. A method comprising:
    receiving an input regarding a mattress assembly from an end user, the input including an indication of a desired feel and a plurality of current layers included in the mattress assembly, the mattress assembly including a cover system and a tub including vertically extending rails and a base defining an interior cavity, and the plurality of current layers comprising rearrangeable foam layers inserted into the tub and covered by the cover system;
    querying a database using the received input;
    receiving a list of layers and a layer arrangement from the database in response to the query;
    identifying at least one of a specialty layer or a replacement layer based on a comparison of the plurality of current layers and the list of layers;
    determining a recommendation including the list of layers, an indication of a cost of the identified at least one of the specialty layer or the replacement layer, and the layer arrangement;
    sending the recommendation to the end user; and
    rearranging the mattress assembly based on the recommendation by opening the cover system to access the plurality of current layers in the tub, removing a first layer and a second layer of the plurality of current layers, replacing the first layer, and inserting the at least one of the specialty layer or the replacement layer in lieu of the removed second layer based on the recommended layer arrangement.

2. The method of claim 1, further comprising:
    receiving a confirmation of the recommendation from the end user;
    sending an instruction to a warehouse to retrieve the identified at least one of the specialty layer and the replacement layer; and
    packaging the identified at least one of the specialty layer or the replacement layer for shipment to the end user.

3. The method of claim 1, further comprising:
    receiving a rejection of the recommendation from the end user;
    determining an updated recommendation based on the rejection; and
    sending the updated recommendation to the end user.

4. The method of claim 1, wherein the plurality of current layers includes five foam layers arranged within a foam tub.

5. The method of claim 4, wherein each of the five foam layers defines a layer thickness and the specialty layer includes a spring layer that defines a specialty thickness that is at least double the layer thickness.

6. The method of claim 1, wherein receiving the input includes retrieving previously stored inputs from the database.

7. A method comprising:
receiving an input regarding a mattress assembly from an end user, wherein the input comprises an indication and a plurality of current layers included in the mattress assembly, the mattress assembly including a cover system and a tub including vertically extending rails and a base defining an interior cavity, and the plurality of current layers comprising rearrangeable foam layers inserted into the tub and covered by the cover system;
querying a database using the received input;
receiving a list of layers and a layer arrangement from the database in response to the query;
identifying at least one replacement layer based on a comparison of the plurality of current layers and the list of layers;
determining a recommendation including the list of layers, an indication of a cost of the identified at least one replacement layer, and the layer arrangement;
sending the recommendation to the end user;
receiving a confirmation of the recommendation from the end user;
sending an instruction to a warehouse to retrieve the identified at least one replacement layer; and
rearranging the mattress assembly based on the recommendation by opening the cover system to access the plurality of current layers in the tub, removing a first layer and a second layer of the plurality of current layers, replacing the first layer, and inserting the at least one replacement layer in lieu of the removed second layer based on the recommended layer arrangement.

8. The method of claim 7, wherein the indicator indication comprises at least one of a desired feel of the mattress assembly, a type of mattress, allergy information, or a user attribute.

9. The method of claim 7, further comprising:
packaging the identified at least one replacement layer for shipment to the end user.

10. The method of claim 7, wherein the at least one replacement layer is a specialty layer, wherein each of the layers in the list of layers defines a layer thickness and the specialty layer includes a spring layer that defines a specialty thickness that is at least double the layer thickness.

11. The method of claim 7, further comprising:
receiving a rejection of the recommendation from the end user;
determining an updated recommendation based on the rejection; and
sending the updated recommendation to the end user.

12. The method of claim 7, wherein the list of layers includes five foam layers.

13. The method of claim 7, wherein receiving the input includes retrieving previously stored inputs from the database.

* * * * *